US010728200B2

(12) United States Patent
Miller et al.

(10) Patent No.: US 10,728,200 B2
(45) Date of Patent: Jul. 28, 2020

(54) MESSAGING SYSTEM FOR AUTOMATED MESSAGE MANAGEMENT

(71) Applicant: MICROSOFT TECHNOLOGY LICENSING, LLC, Redmond, WA (US)

(72) Inventors: Adi Miller, Herzliya (IL); Haim Somech, Herzliya (IL); Ido Priness, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 201 days.

(21) Appl. No.: 15/918,474

(22) Filed: Mar. 12, 2018

(65) Prior Publication Data

US 2019/0281001 A1    Sep. 12, 2019

(51) Int. Cl.
*G06F 15/16* (2006.01)
*H04L 12/58* (2006.01)
*G06N 20/00* (2019.01)

(52) U.S. Cl.
CPC ............ *H04L 51/22* (2013.01); *G06N 20/00* (2019.01); *H04L 51/16* (2013.01); *H04L 51/28* (2013.01); *H04L 51/34* (2013.01)

(58) Field of Classification Search
CPC ..................................................... H04L 51/22
USPC ....................................................... 709/206
See application file for complete search history.

(56) References Cited

U.S. PATENT DOCUMENTS

| 6,782,393 | B1* | 8/2004 | Balabanovic | ........... G06F 16/93 |
| 7,747,719 | B1 | 6/2010 | Horvitz et al. | |
| 8,249,060 | B1 | 8/2012 | Horvitz | |
| 9,292,880 | B1 | 3/2016 | Koorakula et al. | |
| 9,338,197 | B2 | 5/2016 | Smarr et al. | |
| 2002/0097150 | A1* | 7/2002 | Sandelman | ......... G06F 11/0748 |
| | | | | 340/506 |

(Continued)

FOREIGN PATENT DOCUMENTS

WO    2016075707 A1    5/2016

*Primary Examiner* — Hamza N Algibhah
(74) *Attorney, Agent, or Firm* — Shook, Hardy & Bacon LLP

(57) ABSTRACT

Various embodiments, methods, and systems for implementing message management are provided. Message management includes assisting with selecting recipients for messages, and generating, tracking, personalizing, and optimizing messages. The messaging system provides message operations for cycle messages, message tracking interface features, and automatically generating message feature values. In operation, for automatically generating message feature values, a first message to be generated is determined to correspond to a message type. The message type comprises one or more message features, where the one or more messaging features are generated based on customary messaging data. A machine-learning model supports identifying the automatically generated message feature value. A message user interface comprising a message user interface feature is generated based on the message type, such that a first message feature is received to generate the first message based on the automatically generated message feature value. The generated first message is sent to a communication circle.

20 Claims, 12 Drawing Sheets

(56) References Cited

U.S. PATENT DOCUMENTS

| | | | |
|---|---|---|---|
| 2007/0050456 A1* | 3/2007 | Vuong | G06Q 10/107 |
| | | | 709/206 |
| 2009/0049140 A1* | 2/2009 | Stoddard | G06Q 10/107 |
| | | | 709/206 |
| 2011/0106889 A1* | 5/2011 | Scott | G06Q 10/107 |
| | | | 709/206 |
| 2012/0079034 A1 | 3/2012 | Farrell et al. | |
| 2012/0096095 A1 | 4/2012 | Bhargava | |
| 2012/0210334 A1* | 8/2012 | Sutedja | G06Q 10/107 |
| | | | 719/314 |
| 2013/0024780 A1* | 1/2013 | Sutedja | G06Q 10/107 |
| | | | 715/752 |
| 2016/0065519 A1* | 3/2016 | Waltermann | H04L 51/16 |
| | | | 709/206 |
| 2016/0142344 A1* | 5/2016 | Mandhani | G06F 16/3329 |
| | | | 709/206 |
| 2016/0337292 A1 | 11/2016 | Low et al. | |
| 2017/0048378 A1* | 2/2017 | Rubinstein | H04M 1/72552 |
| 2018/0212908 A1* | 7/2018 | Knudson | H04L 51/08 |

* cited by examiner

MESSAGING SYSTEM FOR AUTOMATED MESSAGE MANAGEMENT

BACKGROUND

Users often rely on messaging systems to generate messages (e.g., electronic mail) to communicate with message recipients. Such messaging systems provide graphical user interfaces and tools for generating and sending the messages. For example, an email application can support several email operations, including, selecting a recipient for a message, composing the message, and sending the message to the recipient. With the ever-increasing use of messaging systems in business and personal settings, improvements in computing operations for messaging systems can provide more efficient processing of messages and efficiency in user navigation of graphical user interfaces.

SUMMARY

Embodiments of the present invention relate to methods, systems, and computer storage media for providing a messaging system for automated message management. By way of background, managing messages in messaging systems (e.g., email applications) can be challenging for users because conventional messaging systems do not include adequate features that assist in selecting recipients for messages, or generating, sending, presenting, or refining messages or message processes. For example, a user may have to navigate through additional graphical user interface windows to identify and select recipients, or manually search through old email messages to copy and paste previously drafted message content to a new email message. As such, drafting a new message often includes several manual actions, including, identifying recipients and composing the message, and additionally, tracking responses and sending additional messages (e.g., reminders).

Moreover, with specific reference to cycle messages, where cycle messages often have multiple rounds of sent messages and reply messages, it can get tedious selecting recipients per cycle, generating messages, and tracking reply messages through one or more cycles (e.g., a first cycle and second cycle), where a final message is drafted and sent in a final cycle. By way of example, in a large organization, messages that impact several groups of employees are periodically sent out. Because of the impact of these types of messages, drafting and sending them usually involves collaboration between multiple users. However, with conventional messaging systems, this process requires a significant amount of similar manual user intervention, as described above. Overall, comprehensive functionality around managing messages is limited in conventional messaging systems.

Embodiments described in the present disclosure are directed towards technologies for improving message management in a messaging system. The messaging system supports assisting with selecting recipients for messages, and generating, tracking, personalizing, and optimizing messages. At a high level, the messaging system may specifically provide for improved message operations for cycle messages, message tracking interface features, and automatically generating message feature values. Message operations are performed based on message features (e.g., message authors, recipients, message types, message content, graphical user interface elements, dates, and message actions), where message features are generated based on customary messaging data (i.e., past user messaging data and typical user messaging data).

Accordingly, one exemplary embodiment of the present invention provides improved message management for cycle messages. Initially, a message generation trigger, such as a user action or the user context, is identified to generate a first message. Upon identifying the message generation trigger, it is determined that the message corresponds to a cycle message type. For example, the user may be collaborating with one or more communication circles (i.e., recipients) over two or more message cycles to send a final message during a final message cycle. The cycle message type has corresponding message features, such as related message features, that can support managing cycle messages. The message features for the cycle message type are defined or identified from customary messaging data that is extracted or derived from past user messaging data and/or typical user messaging data.

A message user interface comprising a message user interface feature, based on the cycle message type, is generated. For example, a new message window can be generated, where the new message window includes a graphical user interface element that provides information on the cycle message, or a graphical user interface control element that requests an input that is needed for processing cycle messages. A first message feature is received, via the message user interface, to generate the first message. The first message is generated as a cycle message type. The first message is sent to one or more communication circles, as a first cycle message of two or more cycles. A reply message is received from a recipient in the one or more communication circles.

Based on receiving the reply message, a second message user interface comprising a second message user interface feature, based on the cycle message type, is generated. A second message feature is received, via the second message user interface, to generate a second message. The second message, of the cycle message type, is generated based on the first message and the reply message. In this regard, the second message can incorporate, for example, feedback from a reply message. The second message is sent to the one or more communication circles as a second cycle message of the two or more cycles.

As such, the embodiments described herein improve computing operations for assisting with selecting recipients for messages, and generating, tracking, personalizing, and optimizing messages in a messaging system. In particular, the improvement to computing operations for cycle messages, message tracking interface features, and automatically generating message feature values, results in computing efficiency in processing of messages and efficiency in user navigation of graphical user interfaces of messaging systems and composing, sending, and monitoring cycle messages.

This summary is provided to introduce a selection of concepts in a simplified message that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
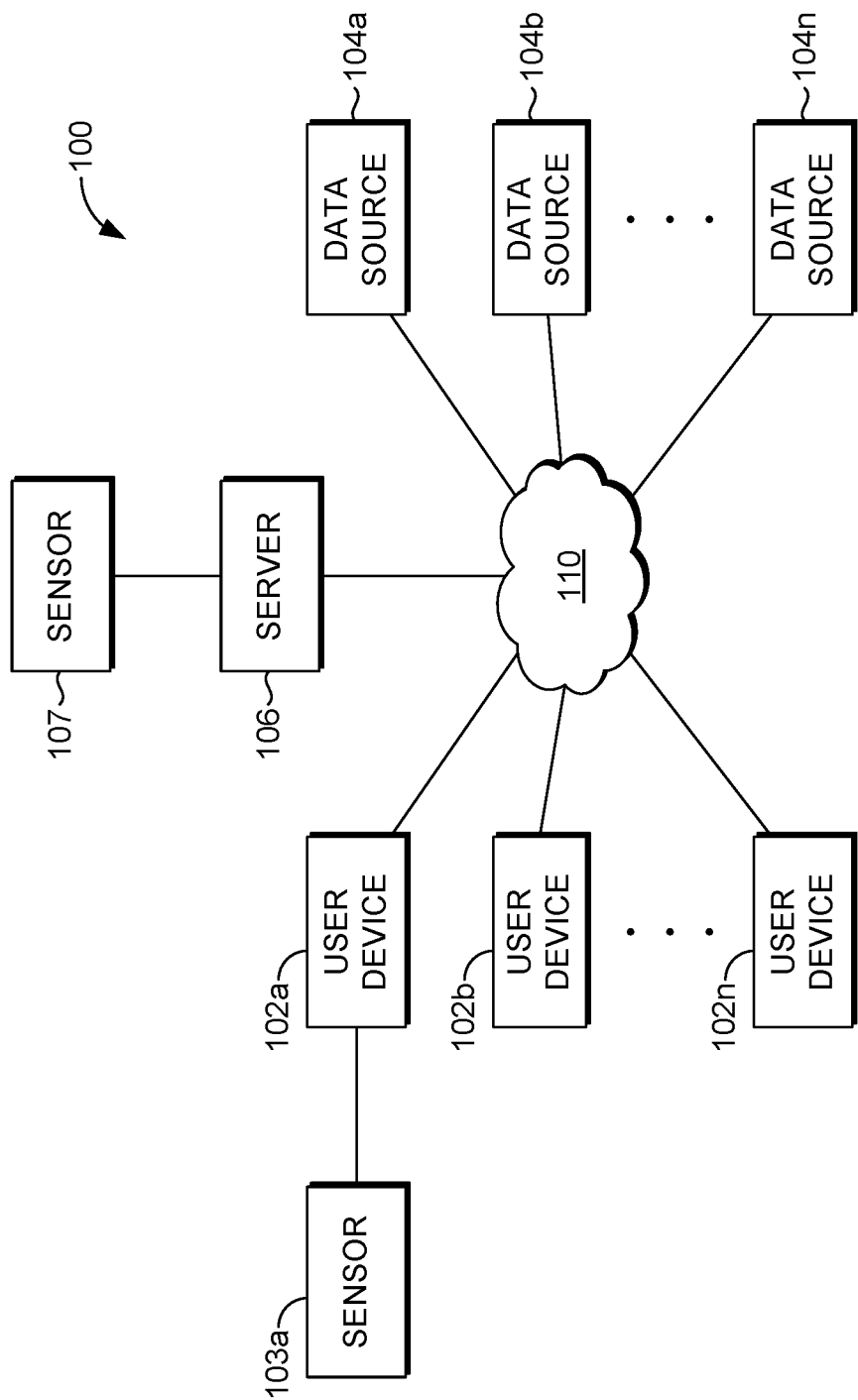
FIG. 1 is a block diagram of a suitable computing environment in which embodiments described herein may be employed.

Messaging systems (e.g., email applications) support sending messages between users of electronic devices. Messaging systems can provide features, such as, graphical user interfaces and message editing tools, amongst other features, that support accessing and composing messages. For example, a user (e.g., message author) can draft an email message, that includes a request for information, and send the email message to an individual user or a group of users (e.g., recipients). A response (e.g., reply message) may be sent from a recipient to the message author or other recipients, thus creating a message thread comprising the original message and reply message. Managing messages, in messaging systems, can be challenging for users because conventional messaging systems do not include adequate features that assist in selecting recipients for messages, or generating, sending, presenting, or refining messages or message processes. For example, when creating a new email, a user may have to manually enter each email recipient into a recipient field in an email application. In some situations, the user may have to search through a listing of email addresses to identify recipients. Email search graphical user interfaces, for selecting recipients, may require multiple clicks through one or more additional interface windows. Moreover, a user may forget to identify all relevant recipients.

With regard to the message content, a user may want to draft a new email message that has related message content in a previously sent email message; however the user has to manually search for the old email message. Unfortunately, if the user is not patient enough to find the old email message, the user may have to draft the new email message from scratch, duplicating at least some of the message content already in the old email message. In another example, large message threads include several reply messages to an original message; a user may manage message folders to track the thread of related messages. Message folders are often visually simplistic, in that the message folders do not immediately convey the interconnections between messages. Further, message folders do not visually provide tracking data for related messages in a thread. It is also common that a user may employ another application, outside of an email application, to record relevant feedback, comments, and action items from the email thread.

Moreover, managing messages can be especially difficult when collaborating with several other users to draft and edit a final message. Messages sent when collaborating to send a final message can be referred to as cycle messages, where messages are exchanged in multiple rounds (i.e., cycles) of collaboration on the final message. By way of example, during a first cycle, a first message is sent and the first message is discussed, among a first group of recipients, in a number of reply messages. During a second cycle, a second message is drafted, based on the first message and the reply messages, and the second message is sent to a second group of recipients. In other situations, collaborating on messages can include several more cycles and additional groups of recipients. As such, sending messages in cycles also requires manually selecting recipients per cycle, generating messages, and tracking reply messages in one or more cycles (e.g., a first cycle and a second cycle) and then sending a final message during a final cycle. For example, an email message to inform employees of a change to employee benefits may implicate several stakeholders over one or more cycles. The user has to manually select recipients per cycle, and then gather and incorporate the feedback, from reply email messages, into a final email message in a final cycle. The change to employee benefits is included in the final email message, along with relevant revisions and/or feedback from the reply email messages. Accordingly, at a high level, there is a realization that conventional messaging systems are limited in providing message management because they lack a model that provides insights into how users interact with a messaging system, such that message operations are based on the model. As such, a comprehensive system that addresses the challenges identified above and other challenges is integral to providing message management functionality.

Embodiments of the present invention relate to methods, systems, and computer storage media for improving message management in a messaging system. The messaging system supports assisting with selecting recipients for messages, and generating, tracking, personalizing, and optimizing messages. At a high level, the messaging system may specifically provide for improved message operations for, cycle messages, message tracking interface features, and automatically generating message feature values. Operationally, message management is based on message objects, where a message object can be a variable, data structure, function, method, or machine-learning model that comprises a location in memory and may be referenced by an identifier. Generally, a message object can be a programmatic representation of an entity associated with a messaging operation. For example, a message object may be an instruction or a data structure that assists in selecting recipients, and also generating, tracking, personalizing, and optimizing messages. Message objects may include, for example, a machine-learning model, a message type object, process workflow object, recipient object, a tracking object, a personalization object, and optimization object.

Message objects are associated with corresponding message features (e.g., message authors, recipients, message types, message content, graphical user interface elements, dates, and message actions) to support message operations. A message feature can refer to a relevant or prominent characteristic associated with a message operation. Message features can be extracted based on data mining customary messaging data, where customary messaging data is identified from past user messaging data or behavior and also typical messaging data or behavior from similar or other users in a messaging ecosystem, environment, or domain. For example, a machine-learning model can operate to identify relevant message features from customary messaging data. In this regard, message objects comprising message features are developed and refined based on customary message data of the messaging system. For example, a tracking object can be a data structure that supports tracking messages, where the tracking object includes, message features such as, the message type, dates, and message actions; such that the tracking object is used for tracking related messaging operations. The values of these message features may be predefined, user selected, or automatically generated, in accordance with embodiments described herein.

Aspects of the present disclosure relate to technology for improving message management for messages having corresponding message types. A message type is associated with a process workflow that determines actions, dependencies, rules, graphical user interfaces, and related message features that apply to the message type. In this regard, a process workflow includes a model of operations and resources associated with generating and sending messages of corresponding message types. For example, the process workflow model includes a set of rules for each message type. The rules can be coded or scripted into a set of message type rules that are applied for automatically managing messages. The message type rules can be associated with generating a message. Message types may include, for example, a newsletter message type, a welcome message type, a survey message type, or a cycle message type. In particular, a newsletter message type can always require an attachment, a graphic in the body of the message, and a newsletter widget provided in a new message window for a newsletter message.

With specific reference to the cycle message type, the cycle message type can refer to collaborating on sending a final message, where during a first cycle, a first message is sent and the first message is discussed among a first group of recipients in a number of reply messages. And, during a second cycle, a second message is drafted, based on the first message and the reply messages, and the second message is sent to a second group of recipients. In other situations, collaborating on messages can include several more cycles and additional recipients. As used herein, a cycle can refer to a round of multiple rounds of messages. The cycle can be associated with additional cycles as part of a progressive communication of messages to recipients (i.e., communication circle). For example, the communication circles can include a leadership-based communication circle, a team-based communication circle, a committee-based communication circle, or ad hoc communication circle. As used herein, a communication circle can refer to an individual, or group of individuals that are associated together, who can be a recipient of a message. Communication circles can be hierarchical, and increasing or decreasing in number of recipients in each communication circle. As such, a cycle message type supports message operations for communication circles over multiple cycles.

In operation, by way of example, it is determined that a message is a cycle type message. Determining that the message is cycle type message may be based on a user action, for example, a user may explicitly select a cycle message type for a new message from a list of other message types. Determining that the message is cycle type message may also be based on context features. Context features may refer to messaging features and other context data (e.g., computing environment or physical environment) identified for context aware computing, where context aware computing includes determining values for the context features and taking corresponding actions based on the values of the context features.

By way of example, Group A of a company includes a Director of Group A (1 person), Team Managers of Group A (5 people), and Team Members of Group A (20 people). The Director wants to collaborate with the Team Managers to draft an email message communicating new guidelines and policies. As such, when the Director types in a greeting "Dear Team Managers", the greeting alone or in combination with other context features can support making a determination that the message is a cycle type message. When the message is a cycle type message, the process workflow actions, dependencies, rules, graphical user interfaces, and related message features, corresponding to cycle type messages, are initialized. For example, a recipient selector operation and corresponding graphical user interfaces of the messaging system may be triggered, per cycle, to assist the user in selecting recipients for the different cycles of the cycle message.

The message system can include the recipient selector for selecting recipients for the message. The recipient selector may operate based on a recipient object. The recipient selector provides assistance with automatically and dynamically selecting a recipient. Selecting a recipient can be based on context features. With continued reference to the Director of Group A, the Director may start typing an email greeting, which then triggers one or more recipients to be generated as recipients or suggested recipients. For example, the Team Managers of Group A may have an alias (e.g., TeamManagersA@company.com), which is automatically suggested as a recipient for the email message. In this regard, the typed message content can support dynamically adding or removing entries into the list of recipients or suggested recipients. In cycle messages, the combined context features of the cycle messages (e.g., first message, reply message, message actions) can be used to dynamically update the message recipients. For example, if a recipient in a reply message suggests that Team Member A should be part of a discussion about the new guidelines and policies, based on the reply message, TeamMemberA@company.com may be suggested to the Director as a recipient. Other context features, such as most recently received emails, most recently opened emails, related emails, and message type, may also be used to dynamically identify a communication circle as a recipient or a suggested recipient.

Accordingly, in operation, a message user interface, comprising a message user interface feature based on the cycle message type, is generated. For example, the message user interface can be a graphical user interface that supports the recipient selection operation described above (i.e., suggesting TeamManagersA@company.com recipients), or any other process workflow actions for the cycle message type. A first message feature to generate the first message is received, and the first message is generated. For example, the Director can accept the suggested recipient (i.e., TeamManagersA@company.com), through a new message window, so that the first message is generated and sent out to the suggested recipient (i.e., communication circle). The first message is sent out to the communication circle, as a first cycle message of two or more cycles.

A reply message is received from a recipient in the communication circle (i.e., TeamManagersA@company.com). Based on receiving the reply message (i.e., reply message recommending that Team Member A be added to the discussion), a second message user interface, comprising a second message user interface feature based on the cycle message type, is generated. For example, the second message user interface can be a graphical user interface that supports the recipient selection operation described above (i.e., suggesting TeamMemberA@company.com as a recipient), or any other process workflow actions for the cycle message type. A second message feature to generate a second message is received, and the second message is generated, based on the first message and the reply message. The second message is sent to the communication circles (i.e., TeamManagersA@company.com, TeamMemberA@company.com), as a second cycle message of the two or more cycles). It is further contemplated that a third cycle can include the Director composing a final message, based on additional reply messages from the Team Managers and Team Member A, and sending the final message to all the Team Members of Group A (e.g., TeamMembers AAll@company.com). The final message includes the new guidelines and policies, along with any incorporated feedback from the Team Managers and Team Member A. Other variations and combinations of cycle messages are contemplated with embodiments of the present invention.

Aspects of the present disclosure relate to technology for improving message management using message tracking interface features. A message tracking interface can refer to a graphical user interface representation of tracking data of messages. In particular, the message tracking interface combines relevant tracking data of messages into a unified interface view. The message tracking interface may specifically include message tracking interface features that correspond to the particular message type. For example, for a cycle message type, the cycle in which a cycle message is currently in may be visually represented in the message tracking interface. Tracking messages can be based on a tracking object that includes tracking features. The tracking features can be generated based on customary messaging data, as discussed herein. For example, tracking a cycle message can include tracking the message author and recipient, and also the date and message actions (i.e., actions that have been taken) for the cycle message. A message tracking interface can then be generated to include relevant tracking data of tracking features.

In another example, the cycle message can include a first message and a set of reply messages, in this regard, the message tracking interface can visually represent the relationship between the first message and the set of reply messages. The message tracking interface can include a dashboard, a timeline, icons, control elements or other appropriate graphical user interface elements that depict tracking data of tracking features, provide access to details of tracking data, and support control of tracking operations. For example, in some embodiments, a graphical user interface control element can support receiving an annotation input such that the tracking object is updated. The update to the tracking object can be used to trigger an update to a message tracking interface feature associated with the tracking object. The update to the tracking object may also be used in one or more additional messages that are generated. For example, by clicking on a new message icon displayed in the message tracking interface, a user can easily generate a new message. The new message may be composed and sent to a recipient, so that a tracking object associated with the message thread is updated. A message tracking interface feature associated with the message thread is then also updated.

Aspects of the present disclosure relate to technology for improving message operation for automatically generating message feature values. A machine-learning model generator can be used to generate a machine-learning model that is used to identify customary messaging data, update message objects, and generate message feature values. Several different types of machine-learning algorithms and techniques (e.g., data clustering, linear regression, polynomial regression) are contemplated with embodiments of this invention. At a high level, the machine-learning model uses algorithms that can learn to make data-driven decisions and predictions. The machine-learning model can be built to mine for customary message data that are used to define message features. A message feature can refer to a relevant or prominent characteristic associated with message operations. Message features can be derived or extracted from customary messaging data, where customary messaging data is identified from past user messaging data or behavior and also typical messaging data or behavior from similar or other users in a messaging ecosystem, environment, or domain. Further, the machine-learning model generator can operate to generate a machine learning model that identifies message features that are received and processed to generate message objects and update message objects.

The machine-learning model can also specifically generate probable values of message features based on messaging parameters. The machine-learning model can include automation functions (i.e., values for auto-fill function or auto-suggest function) that generate probable values. In some embodiments, probable values are used as default values for some message features. In this regard, the machine-learning model is used to make predictions for message feature values. Messaging parameters can include weights for parameters, user messaging data, device type data, business rules data, analytics data, user personalization profile, user optimization profile, message features, amongst other messaging parameters, that are used for generating message feature probable values. In one implementation, a selected machine-learning algorithm operates to determine relevance (e.g., a relevance score) of message features and determined probable values (e.g., autofill or auto-suggest values). In some embodiments, the machine-learning model can generate a relevance score as a confidence rating for how relevant the message feature is to a message operation or message object, or a confidence rating for a probable value of a message feature. Advantageously, message features and message feature probable vales are prioritized for implementation in the messaging system based on the relevance score.

In operation, by way of example, with reference to a personalization object and an optimization, the process of generating messages can be personalized or optimized to provide additional message management. Personalization can include tailoring messages based on a personalization object. Personalizing a message can include accessing a personalization object having a personalization message feature based on information of a message author. The machine-learning model can identify general relevant messaging features, and may further identify a personalization message features. For example, "email scheduling" may be identified as a personalization object for the particular user, because the user often schedules emails to be sent out. As such, when the user is generating a message, a calendar event or widget that supports scheduling a send time for emails can be automatically generated.

With reference to optimization, optimization can include modifying defined process workflows based on an optimization object. Optimizing a message can include accessing an optimization object having an optimization message feature based on information of a recipient. For example, a process workflow can be altered to accommodate certain recipient behavior. The machine-learning model may determine that a recipient is not responsive to emails; as such, a responsiveness message feature is defined, and associated with a process workflow, such that a notification to make a phone call is triggered to accommodate the recipient's behavior. Other variations and combinations of personalization and optimization for message management are contemplated with embodiments described herein.

Advantageously, the embodiments described herein improve computing operations that result in computing efficiency in processing of messages and efficiency in user navigation of graphical user interfaces of messaging systems. In particular, improvements to operations for selecting recipients for messages, or generating, sending, presenting, or refining messages or message processes are provided in embodiments of the present invention. For example, providing message types (e.g., cycle message type) having corresponding process workflows, is an improvement over conventional computing operations for generating emails. Moreover, message tracking interfaces enable easier user navigation of graphical user interfaces because of the unified view and representation of relevant tracking data of tracking features. Message objects (e.g., data structures or functions) can include message features, such that the message objects improve the way computer operations are performed. The machine-learning model uses customary messaging data to identify relevant message features and to automatically generate values for message features. Overall, these improvements result in less CPU computation, smaller memory requirements, and increased flexibility in messaging systems.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102a and 102b through 102n; a number of data sources, such as data sources 104a and 104b through 104n; server 106; sensors 103a and 107; and network 110. It should be understood that environment 100 shown in FIG. 1 is an example of one suitable operating environment. Each of the components shown in FIG. 1 may be implemented via any type of computing device, such as computing device 800 described in connection to FIG. 8, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 7 herein. By way of example and not limitation, a user device may be embodied as a personal computer (PC), a laptop computer, a mobile or mobile device, a smartphone, a smart speaker, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, an appliance, a consumer electronic device, a workstation, or any combination of these delineated devices, or any other suitable computer device.

Data sources 104a and 104b through 104n may comprise data sources and/or data systems, which are configured to make data available to any of the various constituents of operating environment 100, or system 200 described in connection to FIG. 2A. (For instance, in one embodiment, one or more data sources 104a through 104n provide (or make available for accessing) user data, which may include user-activity related data, to user-data collection component 210 of FIG. 2A.) Data sources 104a and 104b through 104n may be discrete from user devices 102a and 102b through 102n and server 106 or may be incorporated and/or integrated into at least one of those components. In one embodiment, one or more of data sources 104a through 104n comprise one or more sensors, which may be integrated into or associated with one or more of the user device(s) 102a, 102b, or 102n or server 106. Examples of sensed user data made available by data sources 104a through 104n are described further in connection to user-data collection component 210 of FIG. 2A.

Figure 2A:
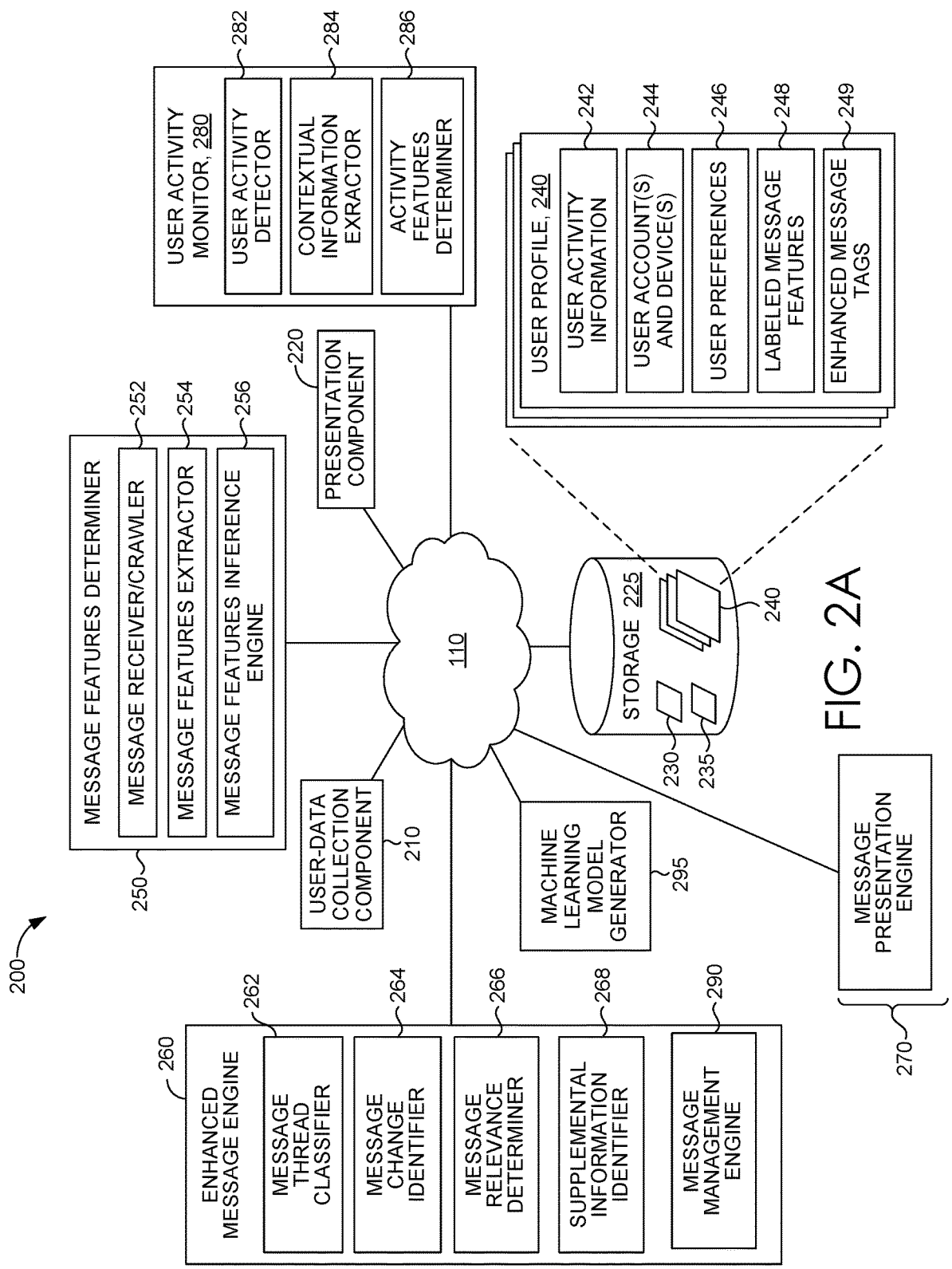
FIGS. 2A-2B are block diagrams of an exemplary messaging system in which embodiments described herein may be employed.

Operating environment 100 can be utilized to implement one or more of the components of system 200, described in FIG. 2A, including components for message management, collecting user data; determining message features, analyzing message relatedness, message changes, message relevance and identifying supplemental information, monitoring user activity and events, user preferences, context data, or related information; and/or presenting an enhanced message display and related content to users. Operating environment 100 also can be utilized for implementing aspects of methods in FIGS. 5, 6 and 7.

Referring now to FIG. 2A, with FIG. 1, a block diagram is provided showing aspects of an example computing system architecture suitable for implementing an embodiment of this disclosure and designated generally as system

200. System 200 represents only one example of suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user-data collection component 210, presentation component 220, message features determiner 250, enhanced message management engine 260, message presentation engine 270, user activity monitor 280, and storage 225. User activity monitor 280 (including its components 282, 284, and 286), enhanced message management engine 260 (including its components 262, 264, 266, 268, and 290), user-data collection component 210, presentation component 220, message presentation engine 270, message management engine 290, and machine-learning model generator 295 may be embodied as a set of compiled computer instructions or functions, program modules, computer software services, or an arrangement of processes carried out on one or more computer systems, such as computing device 800 described in connection to FIG. 8, for example.

In one embodiment, the functions performed by components of system 200 are associated with one or more computer messaging applications, services, or routines (e.g., an email application). In particular, such applications, services, or routines may operate on one or more user devices (such as user device 102a), servers (such as server 106), may be distributed across one or more user devices and servers, or be implemented in the cloud. Moreover, in some embodiments, these components of system 200 may be distributed across a network, including one or more servers (such as server 106) and client devices (such as user device 102a), in the cloud, or may reside on a user device, such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 2A, user-data collection component 210 is generally responsible for accessing or receiving (and in some cases also identifying) user data from one or more data sources, such as data sources 104a and 104b through 104n of FIG. 1. In some embodiments, user-data collection component 210 may be employed to facilitate the accumulation of user data of a particular user (or in some cases, a plurality of users including crowdsourced data) for user activity monitor 280. The data may be received (or accessed), and optionally accumulated, reformatted, and/or combined, by user-data collection component 210 and stored in one or more data stores such as storage 225, where it may be available to other components of system 200. For example, the user data may be stored in or associated with a user profile 240, as described herein. In some embodiments, any personally identifying data (i.e., user data that specifically identifies particular users) is either not uploaded or otherwise provided from the one or more data sources with user data, is not permanently stored, and/or is not made available to user activity monitor 280.

User data may be received from a variety of sources where the data may be available in a variety of formats. For example, in some embodiments, user data received via user-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both. By way of example and not limitation, user data may include data that is sensed or determined from one or more sensors (referred to herein as sensor data), such as location information of mobile device(s), properties or characteristics of the user device(s) (such as device state, charging data, date/time, or other information derived from a user device such as a mobile device), user-activity information (for example: app usage; online activity; searches; voice data such as automatic speech recognition; activity logs; communications data including calls, texts, instant messages, and emails; website posts; other user data associated with communication events) including, in some embodiments, user activity that occurs over more than one user device, user history, session logs, application data, contacts data, calendar and schedule data, notification data, social-network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personal assistant application or service), home-sensor data, appliance data, global positioning system (GPS) data, vehicle signal data, traffic data, weather data (including forecasts), wearable device data, other user device data (which may include device settings, profiles, network-related information (e.g., network name or ID, domain information, workgroup information, connection data, Wi-Fi network data, or configuration data, data regarding the model number, firmware, or equipment, device pairings, such as where a user has a mobile phone paired with a Bluetooth headset, for example, or other network-related information)), gyroscope data, accelerometer data, payment or credit card usage data (which may include information from a user's PayPal account), purchase history data (such as information from a user's Xbox Live, Amazon.com, or eBay account), other sensor data that may be sensed or otherwise detected by a sensor (or other detector) component(s) including data derived from a sensor component associated with the user (including location, motion, orientation, position, user-access, user-activity, network-access, user-device-charging, or other data that is capable of being provided by one or more sensor components), data derived based on other data (for example, location data that can be derived from Wi-Fi, Cellular network, or IP address data), and nearly any other source of data that may be sensed or determined as described herein.

In some respects, user data may be provided in user-data streams or signals. A "user signal" can be a feed or stream of user data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses data continuously, periodically, or as needed.

User activity monitor 280 is generally responsible for monitoring user data for information that may be used for determining user activity information, which may include identifying and/or tracking features (sometimes referred to herein as "variables") or other information regarding specific user actions and related contextual information. Embodiments of user activity monitor 280 may determine, from the monitored user data, user activity associated with a particular user. As described previously, the user activity information determined by user activity monitor 280 may include user activity information from multiple user devices associated with the user and/or from cloud-based services associated with the user (such as email, calendars, social-media, or similar information sources), and which may include contextual information associated with the identified user activity. User activity monitor 280 may determine current or near-real-time user activity information and may also determine historical user activity information, in some embodiments, which may be determined based on gathering observations of user activity over time, accessing user logs of past activity (such as browsing history, for example). Further, in some embodiments, user activity monitor 280 may determine user activity (which may include historical activity) from other similar users (i.e., crowdsourcing), as described previously.

In some embodiments, information determined by user activity monitor 280 may be provided to message features determiner 250 and enhanced message management engine 260 including information regarding the current context and historical context (historical observations). As described previously, user activity features may be determined by monitoring user data received from user-data collection component 210. In some embodiments, the user data and/or information about the user activity determined from the user data is stored in a user profile, such as user profile 240.

In an embodiment, user activity monitor 280 comprises one or more applications or services that analyze information detected via one or more user devices used by the user and/or cloud-based services associated with the user, to determine activity information and related contextual information. Information about user devices associated with a user may be determined from the user data made available via user-data collection component 210, and may be provided to user activity monitor 280, message features determiner 250, enhanced message management engine 260, or other components of system 200.

More specifically, in some implementations of user activity monitor 280, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

Some embodiments of user activity monitor 280, or its subcomponents, may determine a device name or identification (device ID) for each device associated with a user. This information about the identified user devices associated with a user may be stored in a user profile associated with the user, such as in user accounts and devices 244 of user profile 240. In an embodiment, the user devices may be polled, interrogated, or otherwise analyzed to determine information about the devices. This information may be used for determining a label or identification of the device (e.g., a device ID) so that user interaction with the device may be recognized from user data by user activity monitor 280. In some embodiments, users may declare or register a device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

As shown in example system 200, user activity monitor 280 comprises a user activity detector 282, contextual information extractor 284, and an activity features determiner 286. In some embodiments, user activity monitor 280, one or more of its subcomponents, or other components of system 200, such as message features determiner 250 or enhanced message management engine 260, may determine interpretive data from received user data. Interpretive data corresponds to data utilized by these components of system 200 or subcomponents of user activity monitor 280 to interpret user data. For example, interpretive data can be used to provide other context to user data, which can support determinations or inferences made by the components or subcomponents. Moreover, it is contemplated that embodiments of user activity monitor 280, its subcomponents, and other components of system 200 may use user data and/or user data in combination with interpretive data for carrying out the objectives of the subcomponents described herein. Additionally, although several examples of how user activity monitor 280 and its subcomponents may identify user activity information are described herein, many variations of user activity identification and user activity monitoring are possible in various embodiments of the disclosure.

User activity detector 282, in general, is responsible for determining (or identifying) a user action or activity event has occurred. Embodiments of activity detector 282 may be used for determining current user activity or one or more historical user actions. Some embodiments of user activity detector 282 may monitor user data for activity-related message features or variables corresponding to user activity, such as indications of applications launched or accessed, files accessed, modified, copied, websites navigated to, online content downloaded and rendered or played, or similar user activities.

Additionally, some embodiments of user activity detector 282 extract from the user data information about user activity, which may include current user activity, historical user activity, and/or related information such as contextual information. (Alternatively or in addition, in some embodiments, contextual information extractor 284 determines and extracts contextual information. Similarly, in some embodiments, activity features determiner 286 extracts information about user activity, such as user-activity related message features, based on an identification of the activity determined by user activity detector 282.) Examples of extracted user activity information may include app usage, online activity, searches, calls, usage duration, application data (e.g., emails, messages, posts, user status, notifications), or nearly any other data related to user interactions with the user device or user activity via a user device. Among other components of system 200, the extracted user activity information determined by user activity detector 282 may be provided to other subcomponents of user activity monitor 280, message features determiner 250, or enhanced message management engine 260. For example, the user activity information may be used by enhanced message management engine 260 for determining relevance of a communication message to the user, as described below. Further, the extracted user activity may be stored in a user profile associated with the user, such as in user activity information component 242 of user profile 240. (In some embodiments, user activity detector 282 or user activity monitor 280 (or its other sub components) performs conflation on the detected user activity information. For example, overlapping information may be merged and duplicated or redundant information eliminated.)

In some embodiments, user activity detector 282 runs on or in association with each user device for a user. User activity detector 282 may include functionality that polls or analyzes aspects of the operating system to determine user activity related message features (such as installed or running applications or file accesses and modifications, for example), network communications, and/or other user actions detectable via the user device including sequences of actions.

Contextual information extractor 284, in general, is responsible for determining contextual information related to the user activity (detected by user activity detector 282 or user activity monitor 280), such as context features or variables associated with user activity, related information, and user-related activity, and further responsible for associating the determined contextual information with the detected user activity. In some embodiments, contextual information extractor 284 may associate the determined contextual information with the related user activity and may also log the contextual information with the associated user activity. Alternatively, the association or logging may be carried out by another service. For example, some embodiments of contextual information extractor 284 provide the determined contextual information to activity features determiner 286, which determines activity features of the user activity and/or related contextual information.

Some embodiments of contextual information extractor 284 determine contextual information related to user activity such as entities identified in a user activity or related to the activity (e.g., the other party of a call conducted by the user) or a location or venue of the user device when user activity is detected. By way of example and not limitation, this may include context features such as location data, which may be represented as a location stamp associated with the activity; contextual information about the location, such as venue information (e.g., this is the user's office location, home location, school, restaurant, movie theater), yellow pages identifier (YPID) information, time, day, and/or date, which may be represented as a time stamp associated with the activity; user device characteristics or user device identification information regarding the device on which the user carried out the activity; duration of the user activity; other user activity/activities preceding and/or following the user activity (which may include sequences of user activities), other information about the activity such as entities associated with the activity (e.g., venues, people, objects), information detected by sensor(s) on user devices associated with the user that is concurrent or substantially concurrent to the user activity (e.g., motion information or physiological information detected on a fitness tracking user device, listening to music, which may be detected via a microphone sensor if the source of the music is not a user device), or any other information related to the user activity that is detectable that may be used for determining patterns of user activity.

In embodiments using contextual information related to user devices, a user device may be identified by detecting and analyzing characteristics of the user device, such as device hardware, software such as operating system (OS), network-related characteristics, user accounts accessed via the device, and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user. This information about the identified user devices associated with a user may be stored in a user profile associated with the user, such as in user account(s) and device(s) 244 of user profile 240. In an embodiment, the user devices may be polled, interrogated, or otherwise analyzed to determine contextual information about the devices. This information may be used for determining a label or identification of the device (e.g., a device ID) so that user activity on one user device may be recognized and distinguished from user activity on another user device. Further, as described previously, in some embodiments, users may declare or register a user device, such as by logging into an account via the device, installing an application on the device, connecting to an online service that interrogates the device, or otherwise providing information about the device to an application or service. In some embodiments, devices that sign into an account associated with the user, such as a Microsoft® account or Net Passport, email account, social network, or the like, are identified and determined to be associated with the user.

In some implementations, contextual information extractor 284 may receive user data from user-data collection component 210, parse the data, in some instances, and identify and extract context features or variables (which may also be carried out by activity features determiner 286). Context features may be stored as a related set of contextual information associated with the user activity, and may be stored in a user profile such as in user activity information component 242. In some embodiments, the user activity information determined by user activity monitor 280, such as the activity features (which may include context features) are stored in user activity information component 242 as a user relevance model, as described below, and may be used for determining relevance of communication messages to the user, based on the user's activity. For example, if the user's activity indicates the user browses websites on certain topics, then the relevance model may include model parameters indicating that those topics are relevant to the user. Similarly, if the user activity indicates that the user is spending time working with particular file names, project names, client names, or other topics or entities, then those topics or entities may be included in the relevance model, as described further herein. In some instances, relevance model parameters corresponding to these topics or entities (or corresponding to other user activity features) may be weighted according to the frequency, amount of time, and/or recency (i.e., the "freshness" of the activity, which may be used for a decaying weighting, with more recent activity receiving a higher weight than "stale" activity that occurred farther in the past) that these topics or entities (or the other user activity features) occur in the user activity. In some cases, contextual information may be used by message presentation engine 270, such as for personalizing content or a user experience, such as when, where, or how to present messages, message indicators, or related content. Contextual information also may be determined from the user data of one or more users, in some embodiments, which may be provided by user-data collection component 210 in lieu of or in addition to user activity information for the particular user.

Continuing with system 200 of FIG. 2A, message features determiner 250 is generally responsible for determining features of electronic messages. Electronic messages could include, for example, and without limitation, email; instant messages; direct messages; chats; social media communications, which may include tweets, posts, snaps, picturegrams, and other shared-media communications; voicemail, video-mail, mixed-media messages, and similar electronic communication formats. In some embodiments, message features determiner 250 may run on a client computing device, on a server, as a distributed application across multiple devices, or in the cloud. At a high level, message features determiner 250 may receive an electronic message, or may crawl other computer application(s) or service(s) to discover electronic messages with a message receiver/crawler 252. In other words, message receiver/crawler 252 acts as the intake for the message features determiner 250. The messages from message receiver/crawler 252 are provided to, or accessed by, a message features extractor 254. Message features extractor 254 examines each message and extracts, or parses, the message for known features. As an example, and without limitation, message features extracted by message features extractor 254 may include message recipients (including categories for those the message was sent directly to, those who were copied, or whether the message was forwarded), the state of the email (unopened, forwarded, or replied to, for example), date/time the message was sent, information derived from the content of the message, which may include the message subject line or heading (e.g., topics, entities, such as places or people, events, projects, action items, requests, files, or other information) in the message, or attachments to the message. Message features determiner 250 also includes a message features inference engine 256. Message features inference engine 256 analyzes the message, and determines contextual features of the message (such as by using data from the user-data collection component 210 and/or user activity information from the user activity monitor 280 or from user activity information 242 in user profile 240). As an example, and without limitation, contextual or determined features include determining the relationship of the people involved in the message, whether the message is related to a calendar event, whether the message is related to a particular project, or a location associated with the people identified with the message. The features identified by message features extractor 254 and message features inference engine 256 are labeled and stored in user profile 240 in labeled message features 248. In some embodiments, the labeling may comprise indexing the messages according to the extracted and/or inferred message features. The labels or indices, and in some embodiments, the corresponding messages, may be stored in label messages features 248 such that the feature labels (or index) may be used to identify a set of messages based on one or more features. In some embodiments, the message features corresponding to a particular message comprise a message-feature vector, such as an n-dimensional vector of numerical values representing the features characterizing the message, which may be stored in label messages features 248 and made available to enhanced message management engine 260 (or other components of system 200).

Enhanced message management engine 260 is generally responsible for analyzing user activity information 242, information from user accounts and devices 244, user preferences 246, and labeled message features 248 to determine enhanced message tags (stored in user profile 240 as enhanced message tags 249) for one or more electronic messages, which may be used for providing a summary of the message that is personalized to the user, as described herein. As shown in FIG. 2A, enhanced message management engine 260 includes message thread classifier 262, message change identifier 264, message relevance determiner 266, and supplemental information identifier 268.

Message thread classifier 262 operates as a classifier to determine if an electronic message should be considered to be part of a message thread, which may include a logical message thread of related messages from multiple threads. Accordingly and by way of example, a thread could be a set of messages that share some relation, such as a common topic, subject, theme, or participants. In some embodiments, a thread may include messages that are not part of the same original thread or reply chain, which may include multiple messages that are part of the same conversation or otherwise related, including messages sent in the first instance without having replies. (These related messages are sometimes referred to herein as a logical thread.) For example, a particular recipient in a first message thread may send a separate message on the same topic (or having some other relation to the messages in the first message thread) to some or all recipients of the first message thread. This separate message may even spawn a new thread reply chain of messages. Because the separate message is related to the messages in the original thread (here, it is related by topic), then the separate message may be determined to be part of the same (logical) message thread. (This is in contrast to conventional communications-message management engines which would not include or show the separate message as being part of a thread (or reply chain) of messages.)

Message thread classifier 262 uses probabilistic calculations (using classification logic 230 in storage 225) that operate as a thread classification logic. Classification logic 230 include rules, conditions, associations, classification models, or other criteria for comparing the features of different messages and determining a probability that two or more messages are related and thus part of a message thread. For example, in one embodiment, classification logic 230 may include identifying a set of one or more features of a first message, identifying at least a portion or subset of the set of features in a historical message, and comparing the identified subset of features in the historical message to the corresponding features in the first message in order to determine a degree of similarity among the corresponding features. In other words, a feature of the first message, such as a feature characterizing the topic or subject matter of the message, may be identified and compared to a corresponding feature of the historical message (i.e., a feature characterizing the topic or subject matter of the historical message). Based on the similarity, the first message and the historical message may be determined to be (or not to be) related and thus part of a message thread (which may include a logical thread). In some embodiments, where a number of corresponding features are sufficiently similar (which may be determined using a similarity threshold, which may specify, for instance, a number of features necessary to be identical and/or degree(s) of variance in feature values that are permissible in order for two corresponding features to be determined as sufficiently similar), then the first message and historical message may be determined to be related and thus members of a common message thread (which may be a logical message thread).

Accordingly, classification logic 230 can take many different forms depending on the particular features being compared and the mechanism(s) used to determine a degree of message feature similarity. For example, the classification logic may include training data based on message features of historical messages and used to train a neural network classifier used for determining whether a newly received message is similar to (i.e., should be classified as being related to) the historical messages. As another example embodiment, statistical clustering may be performed on feature vectors of a newly received message and historical messages to determine a set of historical messages (if any) that are similar to the newly received message. Moreover, in some embodiments, it is not necessary to compare feature vectors (or more generally to compare message features) of historical messages once the messages have been determined to be part of a thread. Rather, in these embodiments, a feature vector of the newly received message may be compared to message-thread feature vectors (each representing a previously determined message thread or set of related messages). For instance, in one embodiment, the centroid of a cluster, which may be determined from message feature vectors of a previously determined message thread, may be used as a message-thread feature vector for performing a comparison with the feature vector of a newly received message (or a message that has not yet been analyzed for membership in a message thread (i.e., relatedness) by message thread classifier 262) to determine whether the newly received message should be a member of the previously determined message thread.

In some embodiments, classification logic 230 may comprise fuzzy logic, neural network, finite state machine, support vector machine, logistic regression, clustering, or machine-learning techniques, similar statistical classification processes, or combinations of these to identify and compare corresponding features to determine similarity. As one example and at a high level, classification logic 230 (and thus message thread classifier 262) can examine the subject line features of a first message, and compare it to the subject line features of other messages stored in labeled message features 248. As another high level example, using classification logic 230, message thread classifier 262 can also identify a first message as a probable member of a thread if a certain threshold is satisfied regarding the similarity of the features associated with the subject line of the first message and the features associated with the subject lines of the other (historical) messages stored in labeled message features 248, or if the subject matter features of the first message satisfy a similarity threshold with the subject matter features of other historical messages stored in labeled message features 248.

If a message is identified as part of a thread by message thread classifier 262, message change identifier 264 determines changes in the message from the preceding message(s) of the thread. As an example, message change identifier 264 compares features of the current message to features of a previous message in the thread stored in labeled message features 248. As a result, message change identifier 264 could identify, for example, new people added to, or deleted from, the message thread, or new information that was added (this new information could be, for example, newly added in the message, or paraphrased or repeated from a past message). Any changes identified by the message change identifier 264 can be identified and tagged, so that they may be considered for use, for example, to generate and provide a summary of the changes to the user, especially where the changed information is relevant to the user.

Enhanced message management engine 260 also includes message relevance determiner 266 that determines message relevance to a specific user. The message relevance determiner examines the labeled message features 248, as well as other data stored in user profile 240 (e.g., user activity information 242, user accounts and devices 244, and user preferences 246) or received from user activity monitor 280 or user-data collection component 210. As one example, the user preferences 246 may indicate that a user has specifically noted a particular feature that makes an email relevant (such as an email from a specific client, or mentioning a specific company or other topic). As another example, the user activity information 242 may indicate certain relationships between the user and others associated with a message that would raise the degree of relevance of a message (for example, if the message was from a user's boss or wife). As yet another example, information from user accounts and devices 244, such as a calendar event, may indicate that the user has an upcoming meeting and therefore message content related to the meeting or messages from other users invited to the meeting may be deemed relevant because of the urgency.

In some embodiments, message relevance determiner 266 may use relevance logic 235 (in storage 225) to examine the email thread, (which may include the logical thread), and messages within the email thread, to determine if they satisfy a relevance threshold. If the message satisfies the relevance threshold, the message relevance determiner 266 tags the message, or particular message feature(s) relied on for the relevance determination, as relevant with a type of relevance identifier. In some embodiments, if a message fails to satisfy the relevance threshold, the message relevance determiner 266 may tag the message as not relevant. In some embodiments, messages within a thread that are tagged as not relevant are clustered or grouped together and/or hidden from the user (such as depicted at item 649 in FIG. 6). Similarly, sub-threads of messages tagged as not relevant may be clustered or grouped together (such as further described below with reference to FIG. 3) or may be hidden from the user.

Relevance logic 235 may include rules, associations, conditions, prediction (classification) models, or inference algorithms that may be used for determining a likelihood of relevance of a particular message to a user. The relevance logic 235 may take different forms depending on the particular message features (or message feature vector values) evaluated for relevance or the mechanism used to identify likely relevance. Relevance logic 235 may comprise fuzzy logic, neural network, finite state machine, support vector machine, logistic regression, clustering, or machine-learning techniques, similar statistical classification processes, or combinations of these to determine or infer a likelihood of relevance. For example, some embodiments of relevance logic 235 may employ machine-learning mechanisms to determine and maintain a relevance model for a user, based on observed user activity (which may be determined from user activity monitor 280). In some embodiments, the user relevance model comprises a prediction or inference model for predicting (or inferring) whether a message is likely to be relevant to the user based on its feature(s), and may further include a set of model parameters that correspond to various types of message features. In this way, message relevance determiner 266 (using relevance logic 235) may receive labeled message features (which may be in the form of a message feature vector) for a particular message, and use the relevance model to predict or infer a likelihood of relevance of the message to the user. In some instances, the relevance model may be tuned or adjusted (such as by weighting model parameters) using user preferences 246. For example, as described herein, in some instances a user may explicitly indicate, as user preferences, features that are relevant (such as message sender features indicating the message is sent by the user's boss or a client). The relevance model may be stored in a user profile 240 associated with the user.

Enhanced message management engine 260 also includes a supplemental information identifier 268 that, in general, is responsible for determining supplemental information associated with the current email that may be of interest to the user. Supplemental information may include helpful information, such as relevant contextual information (e.g., if a user has not interacted with a particular person in the addressee list, supplemental information might include that person's full contact information, including job title, location or other information); information from other data sources (such as content from websites or links to content useful for the user, such as a link to a website for a client mentioned in the message); or attachments relevant to the subject matter of the message (such as documents or presentation materials).

In some embodiments, the supplemental information may be determined by searching for files, searching within the user's data, and/or previous messages of the thread, to identify files that appear relevant to the message and then present those as part of the supplemental information. Also, for practical, space-saving reasons, the user interface might simply include a link or drop-down style menu that indicate supplemental information is available with some notation (for example, "see related files"). Supplemental information may also be determined from rules based on the specific message, for example, rules for providing relevant links, phone numbers, contextual background, or previous user activity undertaken that is determined likely to be relevant to the message, or other rules for providing the information described herein with regards to supplemental information. In some embodiments, supplemental information generator may determine a corresponding likelihood (using rules or logic similar to or including relevance logic 235) that a particular item of supplemental information is relevant to the message or user. Supplemental information may also be determined based on a semantic understanding, using keyword and pattern analysis, of contextual information of the message and any response information from the user's previous responses or from other users responding to similar messages, which can include user activity history (e.g., browsing history, actions taken) of other users responding to messages in the thread. Further, in some embodiments, supplemental information may be determined in a manner similar to search engine results where context features associated with the message are queried and the results used for determining or providing supplemental information.

In some embodiments, enhanced message management engine 260 includes functionality for summarizing all or a portion of the subject matter content of message, such as summarizing the information determined to be relevant to a user. In particular, some embodiments of enhanced message management engine 260 use rules or logic (which may be similar to classification logic 230 or relevance logic 235) to extract and/or summarize all or portions of a message. For example, a content summary may be generated from the message content corresponding to those message features determined to be relevant to the user by message relevance determiner 266. For instance, the summary may be generated using topic modeling or automatic summarization, which may include extraction or abstraction. In some embodiments, thesis or topic sentences may be identified and labeled or extracted for use in a summary. (In some embodiments, this analysis is carried out by message features determiner 250.) Similarly action items or proposals (e.g., proposed meeting times) may be identified in the message content and labeled or extracted. For example, for an email that includes an action item that is determined to be relevant to the user, the action item may be identified and tagged or labeled so that it may be presented in a summary of the message. In a similar way, the changes tagged or otherwise determined by message change identifier 264 (and in particular changes that include information relevant to a user) may be summarized or extracted so that they may be highlighted for the user. For example, a change identifier, representing the change or summarizing the change, can be generated by enhanced message management engine 260. Similarly, a relevance identifier representing the relevance or a relevance summary can be generated by the enhanced message management engine 260. A supplemental information identifier (such as a link to the supplemental information, for example) can also be generated by the enhanced message management engine 260.

In some embodiments, message relevance determiner 266 provides a message relevance and an associated relevance confidence score regarding the message relevance, which may reflect the likelihood that a user would find the message relevant. Similarly, supplemental information identifier provides supplemental information and an associated confidence score regarding the supplemental information, which may reflect the likelihood that the information is properly associated with the message and thus relevant to the user. More specifically, in some embodiments, a corresponding confidence weight or confidence score may be determined regarding message relevance and/or supplemental information. As one example, the confidence score may be based on the strength of the relevance, which may be determined based on the number of similar message features, types of features, and/or degree of similarity of the message features in common with other relevant messages. The relevance confidence score may correspond to the probability that the message is relevant as determined by message relevance determiner 266 using relevance logic 235. Similarly, in some embodiments, a supplemental information confidence score may be considered when providing supplemental information to message presentation engine 270. For example, in some embodiments, a minimum relevance or supplemental information confidence score may be needed before identifying message relevance or supplemental information. In one embodiment, a threshold of 0.6 (or just over fifty percent) is utilized such that only messages having a 0.6 (or greater) likelihood of relevance, or supplemental information having a similar likelihood of message association, may be provided.

Continuing with FIG. 2A, example system 200 includes a message presentation engine 270, which comprises applications or services that consume information from enhanced message management engine 260 to coordinate with presentation component 220 to present an enhanced message display to a user, as further described below with reference to FIGS. 3A, 3B, 4A, 4B and 4C. At a high level, message presentation engine 270 is responsible for generating and providing aspects of an enhanced and personalized message display, which may include generating presentation logic and/or instructions regarding aspects of a graphical user interface. In particular, the presentation of messages to a user may be personalized via a number of ways. By way of example and not limitation, this may include presenting indicators of messages that are determined to be part of the same message thread (which, as described herein, may be a logical message thread), within a first region of a graphical user interface that is separate from areas where other messages (or indicators of messages) are presented that are not part of that thread; depicting messages (or message indicators) that are part of the same thread within proximity to each other (as presented via a user interface); or depicting an indication of relation between messages in the same thread (such as via a message-thread diagram described in FIG. 4). For instance, a group of icons (i.e., indicators) corresponding to messages that are part of the same thread may be depicted together within a region of the user interface that is separate from other messages that are not part of the thread, which may be received over the same time period as the thread messages. In some embodiments, a message determined to be part of a logical thread, but that is not part of the same reply chain (such as a separate message determined to be related to messages in the same thread), may be indicated as such. For example, a message indicator corresponding to that message may include an indication that the message is from outside the reply chain. (For instance, the message indicator may be colored differently, have a different border, symbol, additional marking, another user-interface element, or other indication for signaling to a user that this message is separate from the reply chain of the other messages (or part of another reply chain).

As another example of the personalization of messages, various identifiers indicating change, relevance, and/or supplemental information may be presented in proximity to messages belonging to the same message thread. For instance, in one embodiment, a region of a graphical user interface for depicting communication messages is used to provide a summary of aspects of those messages that are within the same thread. The summary may be personalized to the user by including information determined to be relevant to the user and derived from the messages in the thread, as described herein (which may include change information or supplemental information). As yet another example, the presentation may be personalized by grouping together or hiding messages that are part of a thread, but are determined to be likely not relevant to a user. Additional details of these and other examples are described in connection to 3A, 3B, 4A, 4B and 4C, which depict example embodiments of enhanced message display in the form of graphical user interfaces for facilitating the personalized presentation of messages.

Example system 200 also includes a presentation component 220 that is generally responsible for presenting message displays and related information (such as supplemental information) to a user. In one embodiment, message presentation engine 270 may operate in conjunction with or may be implemented as one part of presentation component 220. Presentation component 220 may comprise one or more applications or services on a user device, across multiple user devices, or in the cloud. For example, in one embodiment, presentation component 220 manages the presentation of messages and message content to a user across multiple user devices associated with that user. Based on presentation logic or instructions provided by message presentation engine 270, context (which may be received from user activity monitor 280), and/or other user data, presentation component 220 may determine on which user device(s) content is presented, as well as the context of the presentation, such as how (or in what format and how much content, which can be dependent on the user device or context) it is presented, when it is presented, or other such aspects of presentation.

In some embodiments, presentation component 220 generates user interface features associated with or used to facilitate presenting to the user aspects of enhanced or personalized message content (such as relevant messages in a thread or identifiers). Such features can include graphical user interface elements (such as, icons, indicators, graphics buttons, sliders, menus, audio prompts, alerts, alarms, vibrations, pop-up windows, notification-bar or status-bar items, in-app notifications, or other similar features for interfacing with a user), queries, and prompts.

Example system 200 also includes storage 225. Storage 225 generally stores information including data, computer instructions (e.g., software program instructions, routines, or services), logic, profiles, and/or models used in embodiments described herein. In an embodiment, storage 225 comprises a data store (or computer data memory). Further, although depicted as a single data store component, storage 225 may be embodied as one or more data stores or may be in the cloud.

As shown in example system 200, storage 225 includes classification logic 230 and relevance logic 235, as described previously, and user profiles 240. One example embodiment of a user profile 240 is illustratively provided in FIG. 2. Example user profile 240 includes information associated with a particular user such as user activity information 242, information about user accounts and devices 244, user preferences 246, labeled message features 248, and enhanced message tags 249. The information stored in user profile 240 may be available to the message features determiner 250, enhanced message management engine 260, or other components of example system 200.

As described previously, user activity information 242 generally includes user information about user actions or activity events, related contextual information, activity features, or other information determined via user activity monitor 280, and may include historical or current user activity information. User accounts and devices 244 generally includes information about user devices accessed, used, or otherwise associated with a user, and/or information related to user accounts associated with the user, for example, online or cloud-based accounts (e.g., email, social media) such as a Microsoft® Net Passport, other accounts such as entertainment or gaming-related accounts (e.g., Xbox Live, Netflix, online game subscription accounts), user data relating to accounts such as user emails, texts, instant messages, calls, other communications, and other content; social network accounts and data, such as news feeds; online activity; and calendars, appointments, application data, other user accounts, or the like. Some embodiments of user accounts and devices 244 may store information across one or more databases, knowledge graphs, or data structures. As described previously, the information stored in user accounts and devices 244 may be determined from user-data collection component 210 or user activity monitor 280 (including one of its subcomponents).

User preferences 246 generally include user settings or preferences associated with user messaging applications. By way of example and not limitation, such settings may include user preferences about specific addressees or entities that the user considers to be relevant, and thresholds, and/or supplemental information display preferences, as described herein. As described previously, labeled message features 248 may include one or more features from messages determined by message features determiner 250. Enhanced message tags 249 include tags (and, in some embodiments, the associated messages) determined from enhanced message management engine 260 discussed above.

Figure 2B:
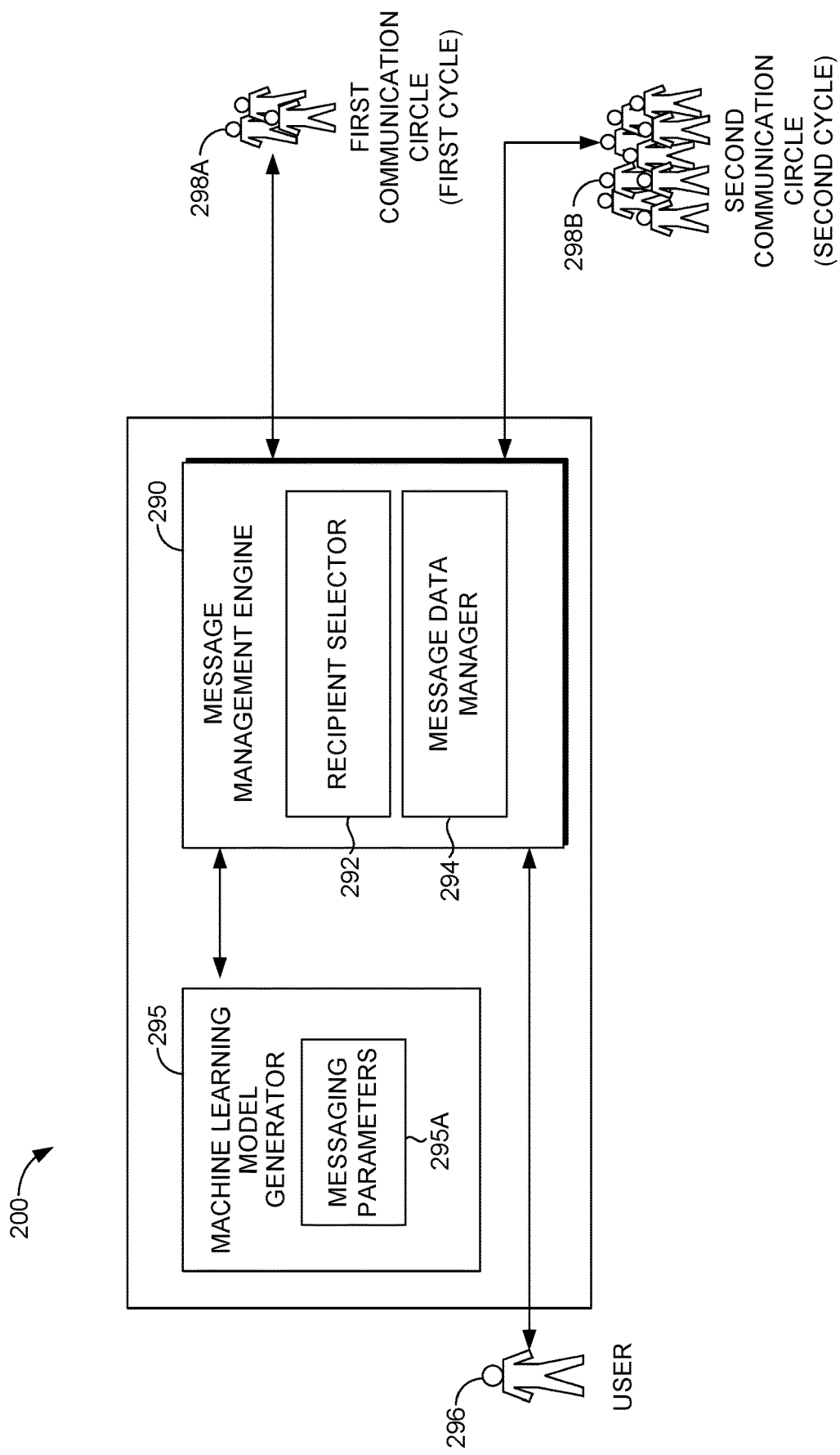

Referring now to FIG. 2B, a block diagram is provided with message management engine 290 from FIG. 2B. FIG. 2B includes the message management engine 290 (including recipient selector 292 and message data manager 294) and machine-learning model generator 295 (including messaging parameters 295A). The components of the messaging system 200 can operate together to execute message operations described herein. FIG. 2B further includes messaging system user 296, first communication circle 298A, and second communication circle 298B.

The message management engine 290 is generally responsible for performing message operations. In some embodiments, message management engine 290 may run on a client computing device, on a server, as a distributed application across multiple devices on in the cloud. At a high level, the message operations are directed towards assisting in selecting recipients for messages and generation, tracking, personalizing and prioritizing message can be facilitated using the message management engine 290. The message management engine 290 operates with message data manager 294. The message data manager 294 provides access to message features (e.g., message authors, recipients, message types, message content, graphical user interface elements, dates, and message actions) and message objects (e.g., a machine-learning model, a message type object, process workflow object, recipient object, a tracking object, a personalization object, and optimization object) to support performing message operations described herein.

The message management engine 290 may identify a message generation trigger to generate messages. The message management engine 290 may identify the message generation trigger explicitly (e.g., user action) or implicitly (e.g., context features). Based on the message generation trigger the message management engine 290 can initiate generating a new message. In some embodiments, the message management engine 290 also operates with the recipient selector 292. The recipient selector 292 operates to assist in selecting recipients for a message. The recipient selector 292 may identify or suggest a recipient for a message at any time while the message is being generated. The recipient selector 292 select may access a machine-learning model of the machine-learning model generator 295 to identify probable recipients as suggested recipients, based on customary user data. In some embodiments, the recipient selector 292 accesses a combined set of context features for the two or more cycles of a cycle message type to select a communication circle as a recipient or suggested recipient.

The message management engine 290 determines that the message corresponds to a message type. The message type can be one of a plurality of message types provided via the message data manager 294. The message type may be a cycle message type. Determining that the message corresponds to a message type can be based on context features. Message types include message features. The machine learning model generator 295 generates a machine-learning model that determines message features based on customary messaging data. The customary messaging data is based on past user messaging data or typical messaging data. The message management engine 290 can access message features that are extracted from customary message data. The message management engine 290 may access the machine-learning model for message features.

The machine-learning model generator 295 can also generate a machine-learning model that supports determining an automatically generated message feature value for a message feature. The automatically generated message feature value is a probable value for the message feature. The probable value may be generated based on messaging parameters 295A that are inputs into the machine-learning model generator 295. In some embodiments, the message management engine 290 accesses a personalization object having a personalization message feature. The personalization message feature tailors generating a message based on information corresponding to a message author. In some embodiments, the message management engine 290 accesses an optimization object having an optimization message feature, where the optimization message feature modifies a process workflow based on information corresponding to a communication circle.

Further, the message management engine 290 can initialize a process workflow comprising actions, dependencies, rules, graphical user interfaces, and related message features. Initializing the process workflow can be performed upon identifying a message type corresponding to a message to be generated. The process flow can be associated with a particular message type. The message management engine 290 references the process workflow for generating and sending messages. The message management engine 290 can generate a message user interface that includes a message interface feature that is based on a message type (e.g., cycle message type). The message management engine 290 receives, via the message user interface, a message feature to generate a message. The message management engine 290 can generate the message and send the message to a communication circle. The message management engine may then receive a reply message from a recipient in the communication circle. The message management engine 290 can generate a subsequent message based on the sent message and the reply message. The message management engine 290 may send the second message to the same or another communication circle.

With continued reference to FIG. 2B, when the message is a cycle message type, the message author (e.g., user 296) generates an input such that the message management engine 290 generates a first message and sends the first message to a first communication circle (e.g., first communication circle 298A) as a first cycle of two or more cycles. The message management engine 290 then receives a reply from a recipient in the first communication circle. Based on receiving the reply message, the message management engine 290 generates a second message user interface that includes a second message user interface feature, based on the cycle message type. The message management engine 290 then receives, via the second message user interface, a second message feature to generate the second message. The message management engine 290 generates the second message based on the first message and the reply message. The message management engine 290 sends the second message to a second communication circle (e.g., second communication circle 298B) as a second cycle message of the two or more cycles.

Figure 3A:
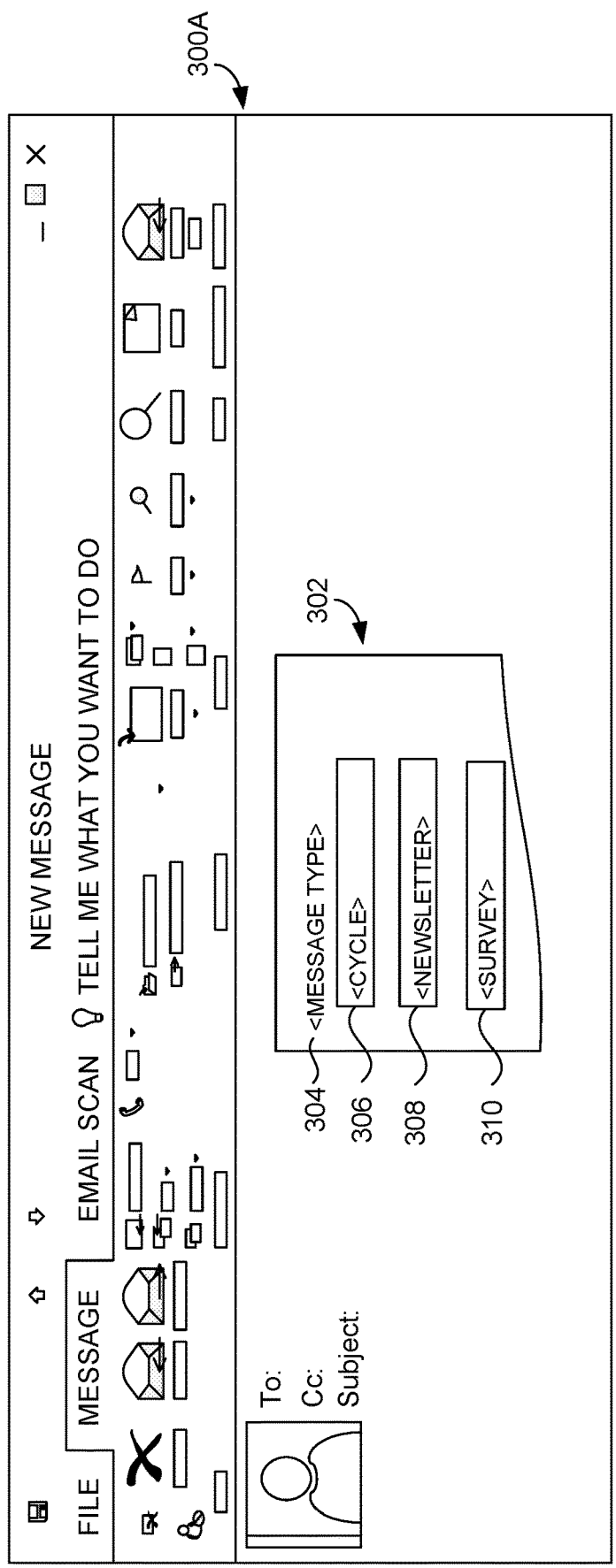
FIGS. 3A-3B are block diagrams of an exemplary messaging system in which embodiments described herein may be employed.

An illustrative example implementing the system 200 is shown in FIG. 3A. FIG. 3A illustrates a schematic screenshot of a new message display 300A. The new message 300A may initially be a blank message. In this example, a user may trigger a dropdown menu 302, with a user action, to select a message type 304 from a list of message types (e.g., cycle 306, newsletter 308, and survey 310). In this example, the user action identifies the message type. Upon selecting a message type, a process flow having actions, dependencies, rules, graphical user interfaces, and related message features, corresponding to the message type, is initialized and referenced for generating and sending messages.

Figure 3B:
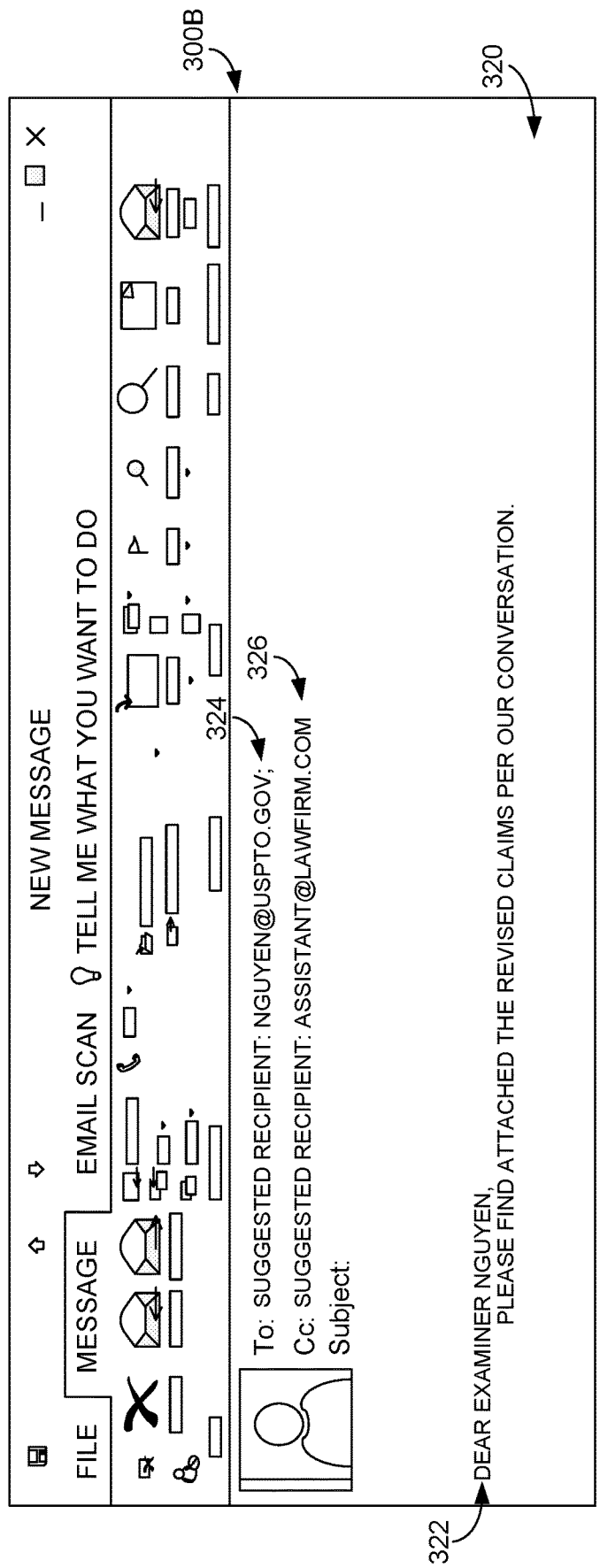

An illustrative example implementing the system 200 is shown in FIG. 3B. FIG. 3B illustrates a schematic screenshot of a new message display 300B. The new message 300B may initially be a blank message. A user may begin typing the message content 322 shown in the display area 320. A recipient selector is configured to dynamically select a communication circle as a recipient or a suggested recipient. When the message type is a cycle message type, the recipient selector is configured to access a combined set of context features for the two or more cycles to select a communication circle as a recipient or a suggested recipient. As shown, immediately above the display area 320 are notification bar 324 and notification bar 326. The notification bar 324 includes an exemplary notification "Suggested Recipient: Nguyen@uspto.gov" and notification bar 326 includes another exemplary notification "Suggest Recipient: Assistant@lawfim.com" generated in accordance with embodiments of the present invention. In particular, the notification bar 324 and notification bar 326 are generated based on the message content 302.

The message management engine 290 may track messages. The message management engine 290 can track a message and a reply message. The message management engine 290 may track messages using a tracking object. The tracking object includes tracking features, where the tracking features are generated based on customary messaging data, as discussed herein. The message management engine 290 can generate a message interface having a message tracking interface feature based on a message type (e.g., cycle message type). The message management engine 290 can also receive, through the message tracking interface, an annotation input. The annotation input can be used to update the tracking object or additional messages that are generated.

Figure 4A:
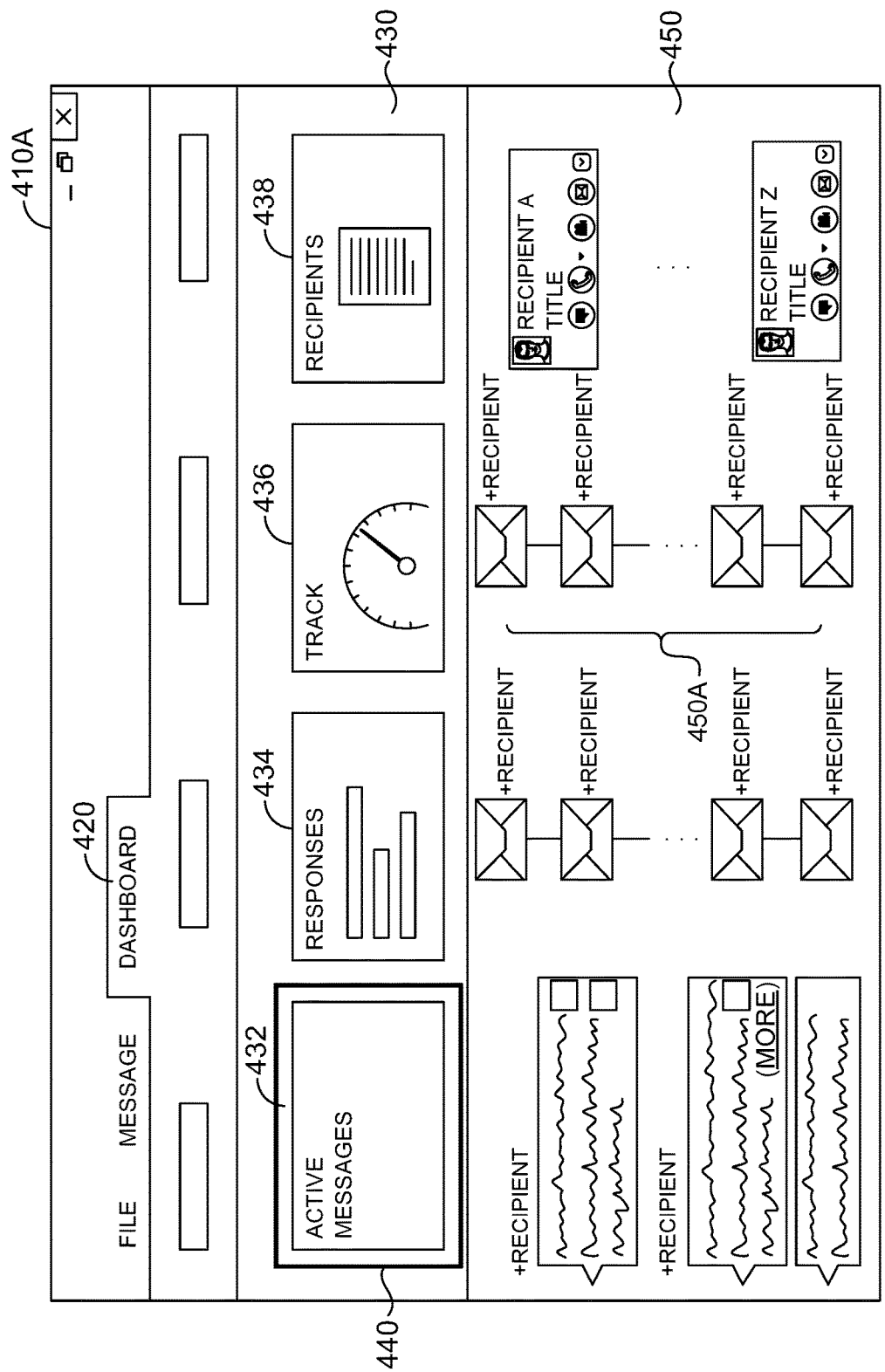
FIGS. 4A-4C are exemplary graphical user interfaces for implementing a messaging system, in accordance with embodiments described herein.
Figure 4B:
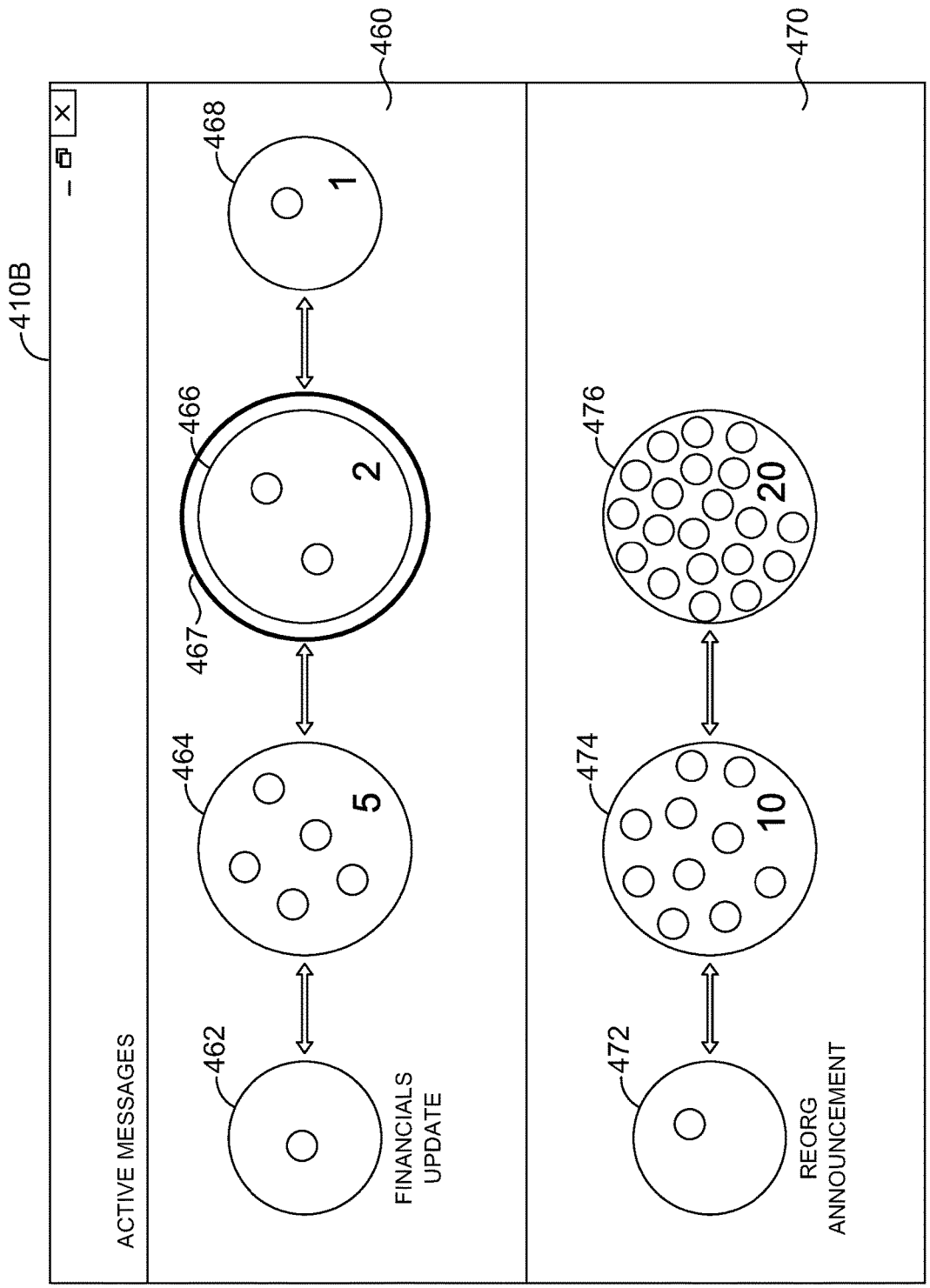
Figure 4C:
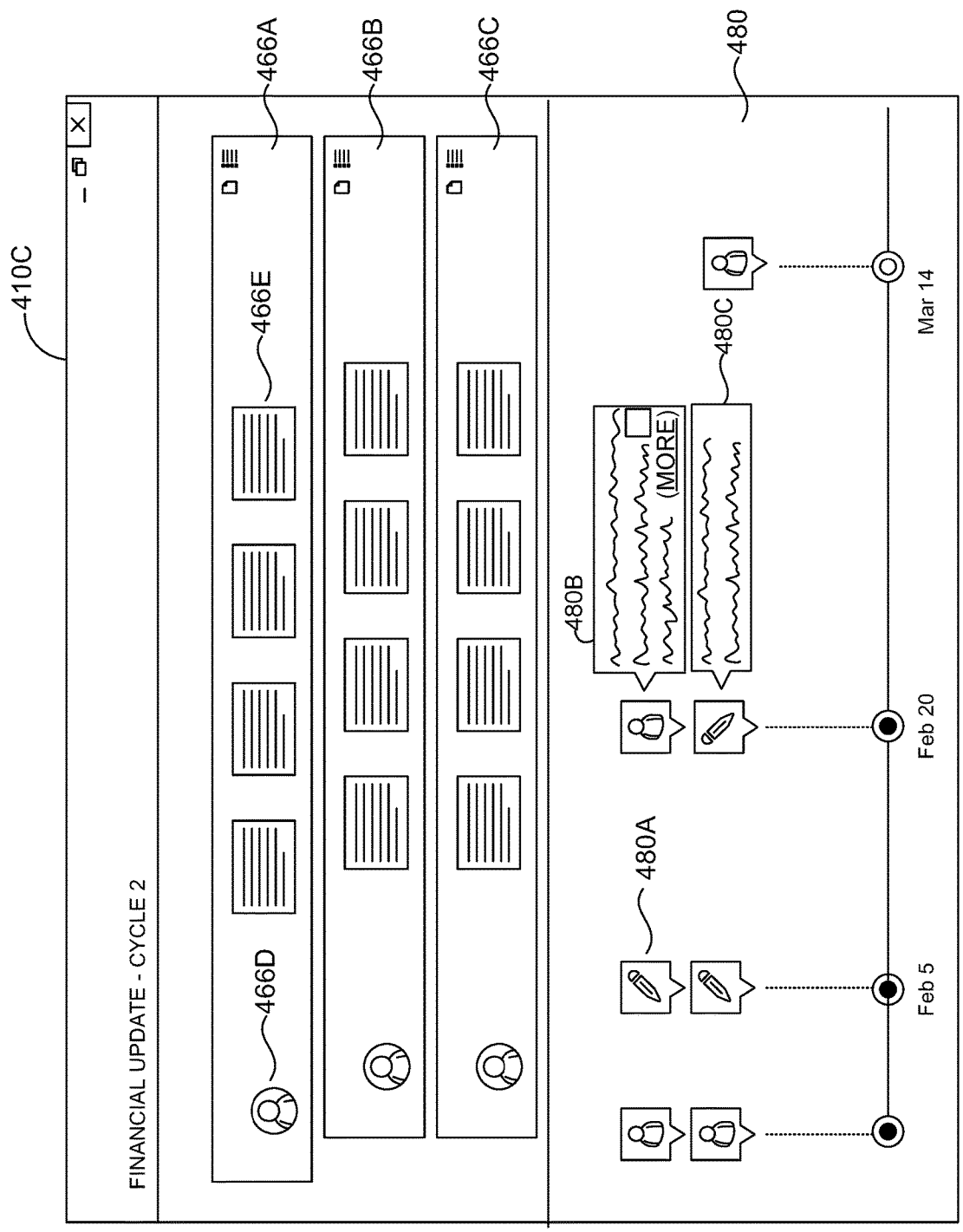

Illustrative examples implementing the system 200 are shown in FIGS. 4A-4C. FIGS. 4A-4C illustrate graphical user interfaces that are associated with functionality supported using the messaging system described herein. FIGS. 4A-4C provide message tracking interfaces that are graphical user interface representations of tracking data of messages. The message tracking interfaces combine relevant tracking data of messages into a unified interface view. FIG. 4A depicts a dashboard interface 410A that includes a dashboard tab 420. The dashboard interface 410A provides a unified view of several features such that the user can efficiently, with limited or no clicks on the dashboard interface 410A, determine the status of different messages (e.g., cycle messages) and further perform operations associated with the messages. The dashboard interface 410A includes a first portion 430 (e.g., message menu) having a plurality of selectable icons (e.g., active messages 432, responses 434, track 436, and recipients 438) corresponding to message features and message operations for functionality described herein. As shown, the active messages icon 432 is highlighted 440 and selecting active communication icon can transition the dashboard interface 410A to a second graphical user interface having details associated with active messages 432. Responses icon 434, track icon 436 and recipients icon 438 may also navigate from the dashboard interface 410A to provide corresponding details. The dashboard interface 410A also includes a second portion 450 that provides a feed of selectable icons for corresponding selectable icons in the first portion 430. For example, the feed of icons 450A can include selectable icons for functionality corresponding to tracking messages or other message operations described herein.

FIG. 4B depicts an active messages interface 410B showing two active cycle message types, the active message interface 410B has a Financials Update portion 460 and a Reorg Announcement portion 470. The active messages interface 410B provides a view to access details of active messages and in particular details of each cycle of an active message. Icons 462, 464, 466, 468, 472, 474, and 476 may depict communication circles as described herein. As shown, the Financials Update portion 460 includes a cycle message type that begins with one message author—icon 462 and progresses through 5 recipients—icon 464, 2 recipients—icon 466, and 1 recipient—icon 468. The icon 466 can be selected (i.e., highlight 467) to transition to additional details (e.g., cycle interface 410C) associated with icon 466. As shown, the Reorg Announcement portion 470 includes a cycle message type that begins with one message author—icon 472 and progress through 10 recipients—icon 474, and then 20 recipients—icon 476. The interface features (e.g., icons) of the active message interface other details, navigation, and operations functionality in accordance with embodiments of the present invention but not depicted in FIG. 4B. In this regard, message tracking interface is generated to include relevant tracking data of tracking features, in particular, for the corresponding cycle message type.

FIG. 4C depicts a cycle interface 410C showing cycle 2 for the Financial Update with its corresponding timeline. The cycle interface 410C provides a view to access details of a particular message cycle (e.g., icon 466 from active messages interface 410B) and corresponding messages, recipients, and timeline for the message cycle. For example, the cycle interface 410 can include several message bars (e.g., message bar 466A, message bar 466B, and message bar 466C) that indicate information associated with a particular message for the specific message cycle. The message bar 466A may be associated with a first message in the second message cycle and message bar 466B and message bar 466C are associated with reply messages to the first message in the second cycle. Each bar may further include additional icons (e.g., icon 466D and icon 466E) that may be used to provide additional information or may be selectable to perform additional message operations to support message management functionality described herein.

FIG. 4C also depicts a timeline portion 480 of the cycle interface 410C for tracking messages. The cycle interface 410C provides a timeline that can correspond to the message cycle information in the message bars message bars (e.g., message bar 466A, message bar 466B, and message bar 466C). The timeline portion 480 provides icons (e.g., icon 480A, 480B and 480C) that are selectable to provide details and perform message operations to support message management functionality described herein. Icon 480A may be selected to reply to a message, icon 480B may be selected to view details for responses on a particular date, and icon 480C can be selected to directly email a recipient from the cycle interface 410C. For example, by clicking on icon 480A to reply to a message, a new message may be generated and sent from the cycle interface 410C. As discussed, a tracking object associated with a message thread of the new message is updated. A message tracking interface feature associated with the message thread is then also updated. As such, a user may much efficiently navigate and access functionality associated with tracking functionality from the cycle interface 410C, and also active messages interface 410B, and dashboard interface 410A.

Figure 5:
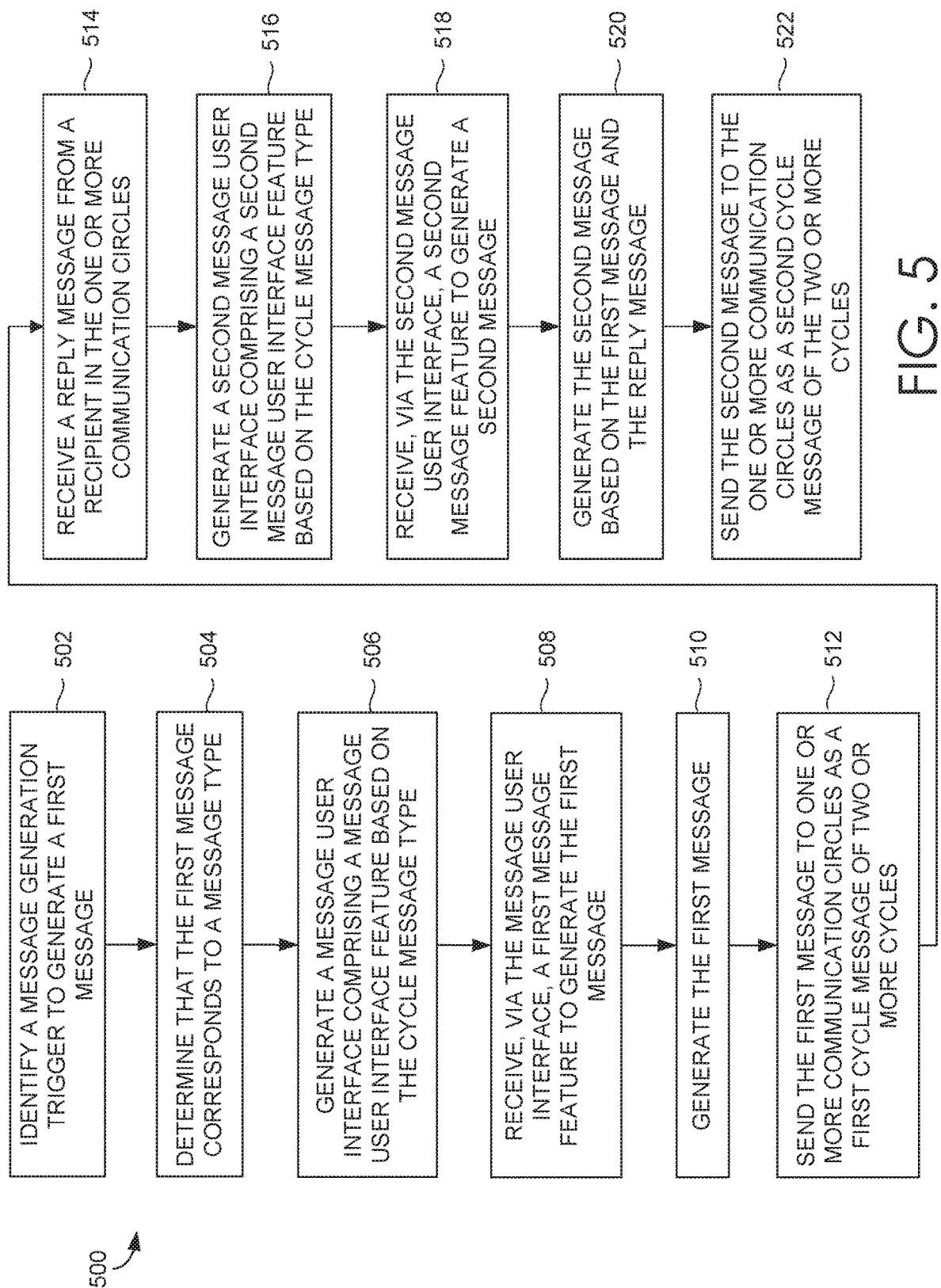
FIG. 5 is a flow diagram showing an exemplary method for implementing a messaging system, in accordance with embodiments described herein.
Figure 6:
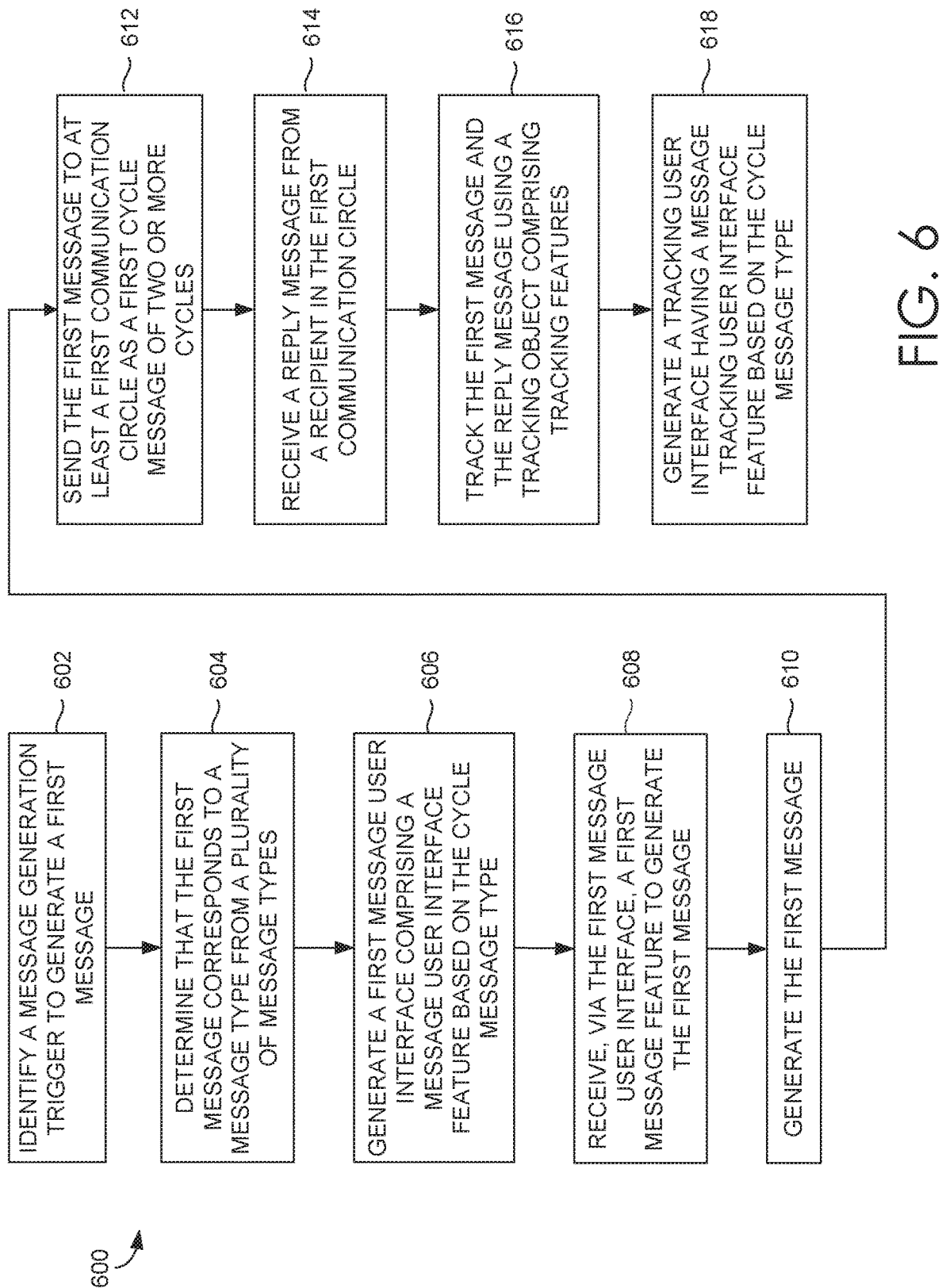
FIG. 6 is a flow diagram showing an exemplary method for implementing a messaging system, in accordance with embodiments described herein.
Figure 7:
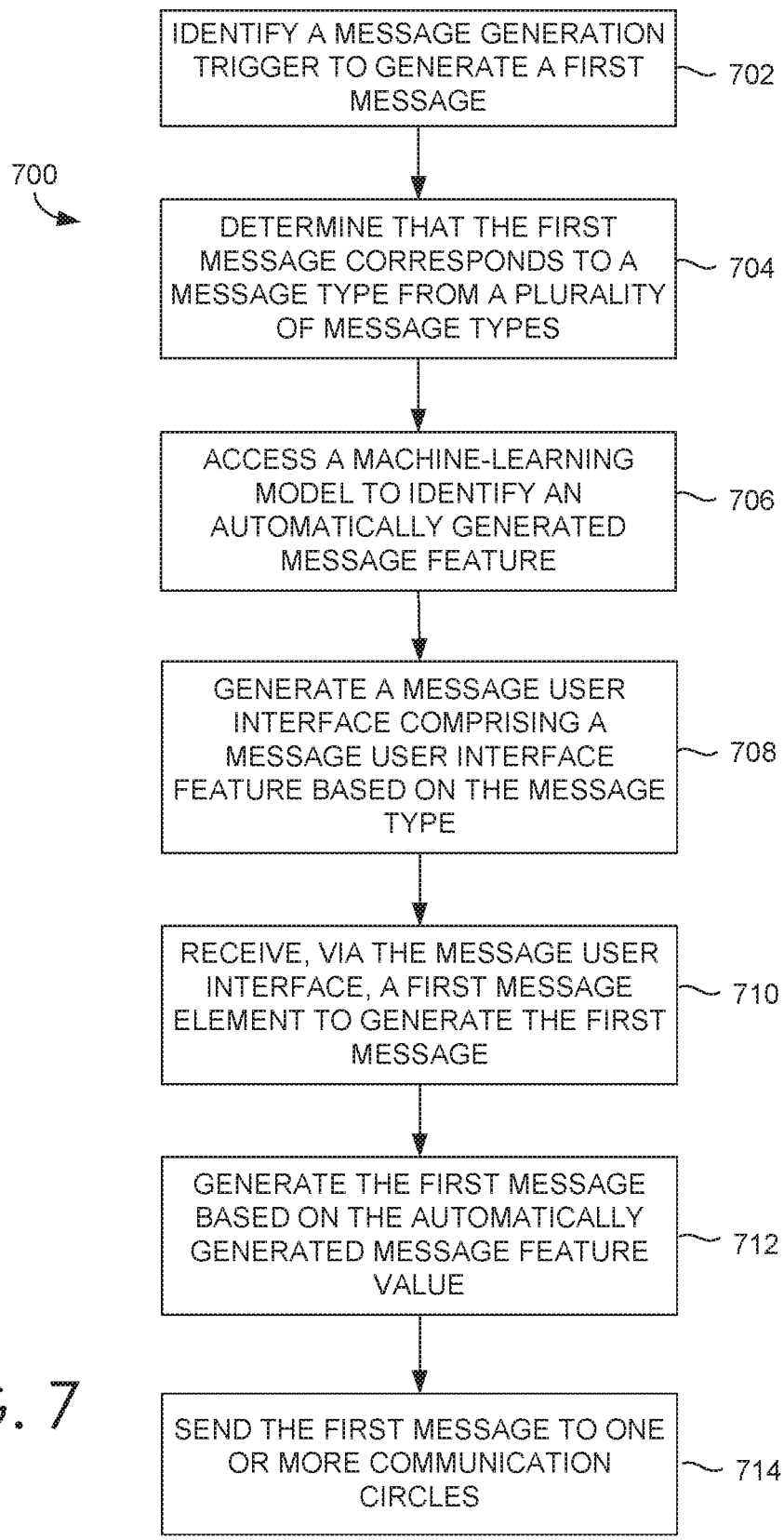
FIG. 7 is a flow diagram showing an exemplary method for implementing a messaging system, in accordance with embodiments described herein.

With reference to FIGS. 5, 6 and 7, flow diagrams are provided illustrating methods for implementing message management system. The methods can be performed using the form generation system described herein. In embodiments, one or more computer storage media having computer-executable instructions embodied thereon that, when executed, by one or more processors, can cause the one or more processors to perform the methods in the system 200.

Turning to FIG. 5, a flow diagram is provided that illustrates a method 500 for implementing message management system. Initially at block 502, a message generation trigger to generate a first message is identified. At block 504, upon identifying the message generation trigger, it is determined that the first message corresponds to a message type, where the message type is a cycle message type. The cycle message type comprises one or more message features. the one or more message features are generated based on customary messaging data. At block 506, a message user interface comprising a message user interface feature based on the cycle message type is generated. At block 508 a first message feature is received via the message user interface to generate the first message. At block 510, the first message is generated. At block 512, the first message is sent to one or more communication circles as a first cycle message of two or more cycles.

At block 514, a reply message is received from a recipient in the one or more communication circles. At block 516, based on receiving the reply message, a second message user interface comprising a second message user interface feature is generated based on the cycle message type. At block 518, a second message feature is received via the message user interface to generate the second message. At block 520, the second message is generated based on the first message and the reply message. At block 522, the second message is sent to the one or more communication circles as a second cycle message of the two or more cycles.

Turning to FIG. 6, a flow diagram is provided that illustrates a method 600 for implementing message management system. Initially at block 602, a message generation trigger is identified to generate a first message. At block 604, upon identifying the message generation trigger, it is determined that that the first message corresponds to a message type from a plurality of message types, where the message type is a cycle message type. The cycle message type comprises one or more message features, the one or more message features are generated based on customary messaging data. At block 606, a first message user interface comprising a message user interface feature is generated based on the cycle message type. At block 608, a first message feature is received via a first message interface to generate the first message. At block 610, the first message is generated. At block 612, the first message is sent to at least a first communication circle as a first cycle message of two or more cycles.

At block 614, a reply message is received from a recipient in the first communication circle. At block 616, the first message and the reply message are tracked using a tracking object comprising tracking features, where the tracking object is generated based on the customary messaging data. At block 618, a message tracking interface having a message tracking interface feature is generated based on the cycle message type.

Turning to FIG. 7, a flow diagram is provided that illustrates a method 700 for implementing message management system. At block 702, a message generation trigger to generate a first message is identified. At block 704, upon identifying the message generation trigger, it is determined that the first message corresponds to a message type from a plurality of message types. The message type comprises one or more message features, where the one or more message features are generated based on customary messaging data.

At block 706, a machine-learning model is accessed to identify an automatically generated message feature value for the one or more message features. The automatically generated message feature value is a probable value for the one or more message features. The probable value is generated based on messaging parameters that are inputs into the machine-learning model. At block 708, a message user interface comprising a message user interface feature is generated based on the message type. At block 710, a first message feature, is received via the message user interface, to generate the first message. At block 712, the first messaged is generated based on the automatically generated message feature value. At block 720, the first message is sent, to one or more communication circles.

Figure 8:
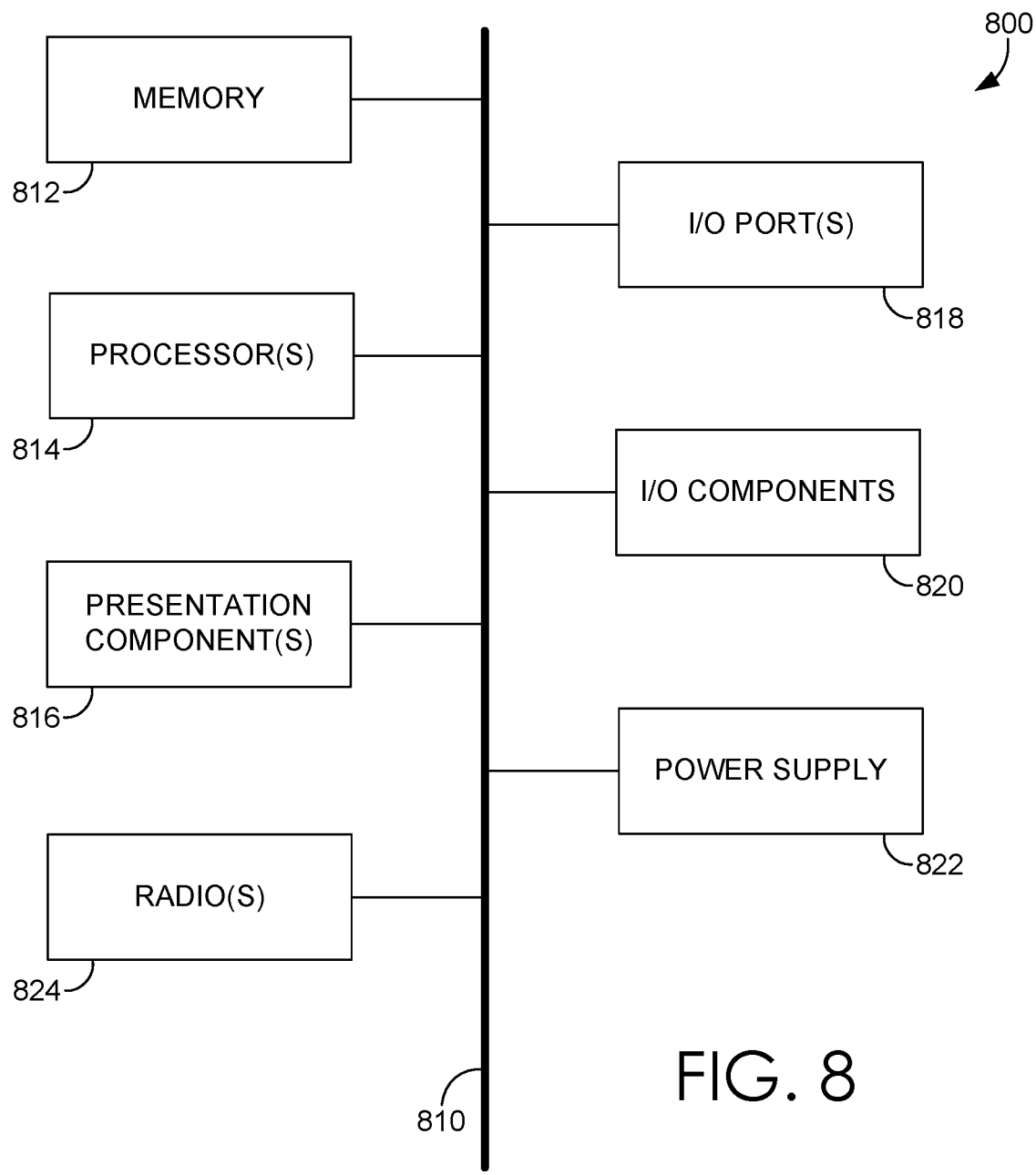
FIG. 8 is a block diagram of an exemplary computing environment suitable for use in implementing embodiments described herein.

Having described various implementations, an exemplary computing environment suitable for implementing embodiments of the disclosure is now described. With reference to FIG. 8, an exemplary computing device is provided and referred to generally as computing device 800. The computing device 800 is but one example of a suitable computing environment and is not intended to suggest any limitation as to the scope of use or functionality of embodiments of the disclosure. Neither should the computing device 800 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, or more specialty computing devices. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 8, computing device 800 includes a bus 810 that directly or indirectly couples the following devices: memory 812, one or more processors 814, one or more presentation components 816, one or more input/output (I/O) ports 818, one or more I/O components 820, and an illustrative power supply 822. Bus 810 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more embodiments of the present disclosure. Distinction is not made between such categories as "workstation," "server," "laptop," or "handheld device," as all are contemplated within the scope of FIG. 8 and with reference to "computing device."

Computing device 800 typically includes a variety of computer-readable media. Computer-readable media can be any available media that can be accessed by computing device 800 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include for example solid-state memory, hard drives, and optical-disc drives. Computing device 800 includes one or more processors 814 that read data from various entities such as memory 812 or I/O components 820. Presentation component(s) 816 presents data indications to a user or other device. Exemplary presentation components include a display device, speaker, printing component, vibrating component, and the like.

The I/O ports 818 allow computing device 800 to be logically coupled to other devices, including I/O components 820, some of which may be built in. Illustrative components include a microphone, joystick, game pad, satellite dish, scanner, printer, or a wireless device. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some embodiments of computing device 800 may include one or more radio(s) 824 (or similar wireless communication components). The radio transmits and receives radio or wireless communications. The computing device 800 may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

The invention claimed is:

1. A system for providing message management, the system comprising:
   one or more hardware processors and memory storing computer-executable instructions and components embodied thereon that, when executed, by the one or more hardware processors, cause the hardware processors to execute:
   a message management engine configured to:
   identify a message generation trigger to generate a first message;
   upon identifying the message generation trigger, determine that the first message corresponds to a message type, wherein the message type is a cycle message type that is configured to support tracking first cycle messages and corresponding reply messages associated with a first group of recipients, and at least one second message of a second cycle, the at least one second message is automatically drafted based on the first cycle messages and the reply messages, wherein the at least one second message is generated for a second group of recipients, wherein the cycle message type comprises one or more message features, wherein the one or more message features are generated based on customary messaging data;

generate a message user interface comprising a message user interface feature based on the cycle message type;

receive, via the message user interface, a first message feature to generate the first message;

generate the first message;

send the first message to one or more communication circles as a first cycle message of two or more cycles;

receive a reply message from a recipient in the one or more communication circles;

based on receiving the reply message, generate a second message user interface comprising a second message user interface feature based on the cycle message type;

receive, via the second message user interface, a second message feature to generate a second message;

generate the second message based on the first message and the reply message; and send the second message to the one or more communication circles as a second cycle message of the two or more cycles.

2. The system of claim 1, further comprising a recipient selector configured to dynamically select a communication circle as a recipient or a suggested recipient.

3. The system of claim 1, further comprising a recipient selector configured to access a combined set of context features for the two or more cycles to select a communication circle as a recipient or a suggested recipient.

4. The system of claim 1, wherein the message type is associated with a corresponding process workflow, wherein process workflows comprise actions, dependencies, rules, graphical user interfaces, and related message features that are initialized and referenced for generating and sending messages.

5. The system of claim 1, further comprising a machine-learning model generator configured to:

generate a machine-learning model, wherein the machine-learning model is accessible to identify the one or more message features from the customary messaging data comprising past user messaging data or typical messaging data.

6. The system of claim 1, further comprising a machine-learning model generator configured to:

generate a machine-learning model, wherein the machine-learning model is accessible to identify an automatically generated message feature value for the one or more message features, wherein the automatically generated message feature value is a probable value for the one or more message features, wherein the probable value is generated based on messaging parameters that are inputs into the machine-learning model.

7. The system of claim 1, wherein the message management engine is further configured to:

track the first message and the reply message using a tracking object comprising tracking features, wherein the tracking features are generated based on the customary messaging data;

generate a message tracking interface having a message tracking interface feature based on the cycle message type;

receive, via the message tracking interface, an annotation input; and based on the annotation input, update the tracking object or one or more additional messages that are generated.

8. The system of claim 1, wherein the message management engine is further configured to:

access a personalization object having a personalization message feature, wherein the personalization message feature tailors generating messages based on information corresponding to a message author.

9. The system of claim 1, wherein the message management engine is further configured to:

access an optimization object having an optimization message feature, wherein the optimization message feature modifies process workflows based on information corresponding to a recipient.

10. One or more computer storage media having computer-executable instructions embodied thereon that, when executed by one or more processors, cause the one or more processors to perform a method for providing message management, the method comprising:

identifying a message generation trigger to generate a first message;

upon identifying the message generation trigger, determining that the first message corresponds to a message type from a plurality of message types, wherein the message type is a cycle message type, wherein the cycle message type comprises one or more message features, wherein the one or more message features are generated based on customary messaging data;

generating a first message user interface comprising a message user interface feature based on the cycle message type;

receiving, via the first message user interface, a first message feature to generate the first message;

generating the first message;

sending the first message to at least a first communication circle as a first cycle message of two or more cycles;

receiving a reply message from a recipient in the first communication circle;

tracking the first message and the reply message using a tracking object comprising tracking features, wherein the tracking features are generated based on the customary messaging data; and generating a message tracking interface having a message tracking interface feature based on the cycle message type.

11. The media of claim 10, the method further comprising:

based on receiving the reply message, generating a second message user interface comprising a second message user interface feature based on the cycle message type;

receiving, via the second message user interface, a second message feature to generate a second message, wherein the second message is based on the first message and the reply message;

generate the second message; and send the second message to at least a second communication circle as a second cycle message of the two or more cycles.

12. The media of claim 10, further comprising:

receiving, via the message tracking interface, an annotation input; and based on the annotation input, updating the tracking object or one or more additional messages that are generated.

13. The media of claim 10, wherein each of the plurality of message types is associated with a corresponding process workflow, wherein process workflows comprise actions, dependencies, rules, graphical user interfaces, and related message features that are initialized and referenced for generating and sending messages.

14. The media of claim 10, wherein a machine-learning model supports identifying the one or more message features from the customary messaging data comprising past user messaging data or typical messaging data.

15. The media of claim 10, further comprising:
accessing a machine-learning model to identify an automatically generated message feature value for the one or more message features, wherein the automatically generated message feature value is a probable value for the one or more message features, wherein the probable value is generated based on messaging parameters that are inputs into the machine-learning model.

16. The media of claim 10, the method further comprising:
accessing a personalization object having a personalization message feature, wherein the personalization message feature tailors generating messages based on information corresponding to a message author; or
accessing an optimization object having an optimization message feature, wherein the optimization message feature modifies process workflows based on information corresponding to a recipient.

17. A computer implemented method for providing message management, the method comprising:
identifying a message generation trigger to generate a first message;
upon identifying the message generation trigger, determining that the first message corresponds to a message type, wherein the message type comprises one or more message features, wherein the one or more message features are generated based on customary messaging data;
accessing a machine-learning model to identify an automatically generated message feature value for the one or more message features, wherein the automatically generated message feature value is a probable value for the one or more message features, wherein the probable value is generated based on messaging parameters that are inputs into the machine-learning model;
generating a message user interface comprising a message user interface feature based on the message type;
receiving, via the message user interface, a first message feature to generate the first message;
generating the first message based on the automatically generated message feature value; and
sending the first message to one or more communication circles.

18. The method of claim 17, wherein the message type is a cycle message type, wherein the cycle message type is associated with sending messages to two or more communication circles over two or more cycles.

19. The method of claim 17, wherein each of the plurality of message types is associated with a corresponding process workflow, wherein process workflows comprise actions, dependencies, rules, graphical user interfaces, and related message features that are initialized and referenced for generating and sending messages.

20. The method of claim 17, further comprising:
tracking the first message and the reply message using a tracking object comprising tracking features, wherein the tracking features are generated based on the customary messaging data; and
generating a message tracking interface having a message tracking interface feature based on the cycle message type.

* * * * *